US012188290B2

(12) United States Patent
Elsmark

(10) Patent No.: US 12,188,290 B2
(45) Date of Patent: Jan. 7, 2025

(54) ARRANGEMENT FOR CONTROLLING MOVEMENTS OF ACCESS MEMBER, ACCESS MEMBER, FRAME, ACCESS MEMBER SYSTEM AND METHOD

(71) Applicant: ASSA ABLOY AB, Stockholm (SE)

(72) Inventor: Lars Elsmark, Saltsjö-Boo (SE)

(73) Assignee: ASSA ABLOY AB, Stockholm (SE)

( * ) Notice: Subject to any disclaimer, the term of this patent is extended or adjusted under 35 U.S.C. 154(b) by 86 days.

(21) Appl. No.: 18/013,861

(22) PCT Filed: Jun. 18, 2021

(86) PCT No.: PCT/EP2021/066680

§ 371 (c)(1),
(2) Date: Dec. 29, 2022

(87) PCT Pub. No.: WO2022/002646

PCT Pub. Date: Jan. 6, 2022

(65) Prior Publication Data

US 2023/0295972 A1 Sep. 21, 2023

(30) Foreign Application Priority Data

Jun. 30, 2020 (SE) .................................... 2050802-4

(51) Int. Cl.
*E05F 3/16* (2006.01)
*E05F 1/10* (2006.01)

(52) U.S. Cl.
CPC .............. *E05F 3/16* (2013.01); *E05F 1/1066* (2013.01); *E05Y 2201/232* (2013.01); (Continued)

(58) Field of Classification Search
CPC . E05F 3/16; E05F 1/1066; E05F 1/025; E05F 15/627; E05F 3/00; E05F 1/08; (Continued)

(56) References Cited

U.S. PATENT DOCUMENTS 4,675,938 A * 6/1987 Bundschuh ............. E05F 5/003 16/64
4,973,894 A 11/1990 Johansson
(Continued)

FOREIGN PATENT DOCUMENTS

DE 102018133025 6/2020
EP 0559947 9/1993
(Continued)

OTHER PUBLICATIONS

Official Action for Sweden Patent Application No. 2050802-4, dated Feb. 4, 2021, 11 pages.
(Continued)

*Primary Examiner* — David Luo
(74) *Attorney, Agent, or Firm* — Schwegman Lundberg & Woessner, P.A.

(57) ABSTRACT

An arrangement (16) for controlling movements of an access member (12) relative to a frame (14), the arrangement (16) comprising abase section (18) for connection to either the access member (12) or the frame (14); a fixation part (20) for connection to the other of the access member (12) and the frame (14); a flexible elongated element (22) configured to be tensioned to thereby force the base section (18) and the fixation part (20) to move towards each other in a relative closing movement (86); and a braking device (82) arranged to brake a speed of the relative closing movement (86).

25 Claims, 22 Drawing Sheets

(52) U.S. Cl.
CPC ... *E05Y 2201/258* (2013.01); *E05Y 2201/266* (2013.01); *E05Y 2201/654* (2013.01); *E05Y 2201/668* (2013.01); *E05Y 2400/20* (2013.01); *E05Y 2900/132* (2013.01)

(58) Field of Classification Search
CPC ................. E05F 1/10; E05Y 2201/232; E05Y 2201/258; E05Y 2201/266; E05Y 2201/654; E05Y 2201/668; E05Y 2400/20; E05Y 2900/132; E05Y 2201/26; E05Y 2201/41; E05Y 2201/21; E05Y 2201/426; E05Y 2400/302; E05Y 2400/616; E05Y 2201/422; E05Y 2201/644; E05Y 2400/612
USPC .......................... 318/266, 265, 264, 256, 255
See application file for complete search history.

(56) References Cited

U.S. PATENT DOCUMENTS

| | | | | |
|---|---|---|---|---|
| 6,177,771 | B1 * | 1/2001 | Kinzer | G05B 19/291 318/467 |
| 7,815,242 | B2 * | 10/2010 | Yoshida | E05F 15/646 296/146.4 |
| 8,169,169 | B2 * | 5/2012 | Hass | E05F 15/63 361/84 |
| 10,392,849 | B2 * | 8/2019 | Xiao | E05F 15/611 |
| 10,487,561 | B2 | 11/2019 | Worner | |

FOREIGN PATENT DOCUMENTS

| | | |
|---|---|---|
| GB | 2561572 | 10/2018 |
| JP | H08-319754 | 12/1996 |
| JP | 2013-155495 | 8/2013 |
| KR | 10-1016211 | 2/2011 |
| KR | 10-2011-0027301 | 3/2011 |
| WO | 2022002646 | 1/2022 |

OTHER PUBLICATIONS

Official Action for Sweden Patent Application No. 2050802-4, dated Apr. 8, 2022, 7 pages.
International Search Report and Written Opinion for International (PCT) Patent Application No. PCT/EP2021/066680, dated Sep. 21, 2021, 14 pages.
Written Opinion of the International Preliminary Examining Authority for International (PCT) Patent Application No. PCT/EP2021/066680, dated Feb. 9, 2022, 6 pages.
International Preliminary Report on Patentability for International (PCT) Patent Application No. PCT/EP2021/066680, dated Oct. 12, 2022, 21 pages.
"International Application Serial No. PCT EP2021 066680, Response to Written Opinion filed Jan. 12, 2022 to Written Opinion mailed Sep. 21, 2021", 17 pgs.
"International Application Serial No. PCT EP2021 066680, Response to Written Opinion filed Mar. 21, 2022 to Written Opinion mailed Feb. 9, 2022", 18 pgs.
"Swedish Application Serial No. 2050802-4, Office Action mailed Jun. 9, 2023", 5 pgs.
"SE Patent application No. 2050802 4 4th Office Action mailed Sep. 27, 2024", 7 pages.

* cited by examiner

ARRANGEMENT FOR CONTROLLING MOVEMENTS OF ACCESS MEMBER, ACCESS MEMBER, FRAME, ACCESS MEMBER SYSTEM AND METHOD

CROSS REFERENCE TO RELATED APPLICATIONS

This application is a national stage application under 35 U.S.C. 371 and claims the benefit of PCT Application No. PCT/EP2021/066680 having an international filing date of Jun. 18, 2021, which designated the United States, which PCT application claimed the benefit of Sweden Patent Application No. 2050802-4 filed Jun. 30, 2020, the disclosure of each of which are incorporated herein by reference.

TECHNICAL FIELD

The present disclosure generally relates to arrangements for controlling movements of an access member. In particular, an arrangement comprising a flexible elongated element for controlling movements of an access member relative to a frame, an access member for moving relative to a frame, a frame for an access member, an access member system and a method of controlling movements of an access member relative to a frame, are provided.

BACKGROUND

Some conventional door closers comprise a spring and a hydraulic cylinder containing oil. The spring may be increasingly compressed (or otherwise deformed) during opening of the door leaf. The hydraulic cylinder may provide a damping force proportional to the speed of the door leaf. The use of oil may however not be desired, for example due to fire safety, leakage and sustainability. Moreover, such conventional door closers often have unsatisfactory reliability, for example due to temperature changes and wear. Furthermore, such conventional door closers are often difficult to install, for example due to complicated adjustments. Furthermore, such conventional door closers often have a mechanically complex design, for example including complex cam profiles to control a closing force.

U.S. Pat. No. 4,973,894 A discloses a door closer comprising a force transmission shaft turning in accordance with the movement of a door, a spring element operationally connected with the force transmission shaft so that opening of the door takes place against the force of the spring element, and a dynamic machine comprising rotor means arranged in force transmission connection with the force transmission shaft and stator means operationally connected with the rotor means.

SUMMARY

One object of the present disclosure is to provide an arrangement for controlling movements of an access member relative to a frame, which arrangement has a less complicated design and/or operation.

A further object of the present disclosure is to provide an arrangement for controlling movements of an access member relative to a frame, which arrangement has a cost effective design and/or operation.

A still further object of the present disclosure is to provide an arrangement for controlling movements of an access member relative to a frame, which arrangement has a reliable design and/or operation.

A still further object of the present disclosure is to provide an arrangement for controlling movements of an access member relative to a frame, which arrangement has a compact design.

A still further object of the present disclosure is to provide an arrangement for controlling movements of an access member relative to a frame, which arrangement is less complicated to install.

A still further object of the present disclosure is to provide an arrangement for controlling movements of an access member relative to a frame, which arrangement enables an effective latching of an access member to a frame.

A still further object of the present disclosure is to provide an arrangement for controlling movements of an access member relative to a frame, which arrangement solves several or all of the foregoing objects in combination.

A still further object of the present disclosure is to provide an access member for moving relative to a frame, which access member solves one, several or all of the foregoing objects.

A still further object of the present disclosure is to provide a frame for an access member, which frame solves one, several or all of the foregoing objects.

A still further object of the present disclosure is to provide an access member system comprising a frame and an access member movable relative to the frame, which access member system solves one, several or all of the foregoing objects.

A still further object of the present disclosure is to provide a method of controlling movements of an access member relative to a frame, which method solves one, several or all of the foregoing objects.

According to one aspect, there is provided an arrangement for controlling movements of an access member relative to a frame, the arrangement comprising a base section for connection to either the access member or the frame; a fixation part for connection to the other of the access member and the frame; a flexible elongated element configured to be tensioned to thereby force the base section and the fixation part to move towards each other in a relative closing movement; and a braking device arranged to brake a speed of the relative closing movement.

When the base section and the fixation part move away from each other in a relative opening movement, opposite to the closing movement, for example when a user opens a door, the tension in the elongated element may increase. The elongated element is in this case arranged to be tensioned to thereby force the base section and the fixation part in the relative closing movement. Alternatively, the tension in the elongated element may always be high, i.e. in both open and closed positions of the access member.

Since the braking device is arranged to brake a speed of the relative closing movement, the closing effect accomplished by the elongated element is decreased or eliminated when the braking device is activated. In this way, a speed of the relative closing movement can be braked. The arrangement may or may not comprise a device for forcing the base section and the fixation part to move away from each other in the relative opening movement. One example of such device is an opening force device as described herein. However, when the arrangement is installed in an access member system comprising an access member and a frame, there may also be friction acting against relative movements between the access member and the frame that enables the access member to be braked by reducing or eliminating the closing effect accomplished by the elongated element.

Since the elongated element is flexible, the elongated element can be arranged along a substantially straight line, or a straight line, between the base section and the fixation part when the base section and the fixation part are distanced from each other. One advantage with this is that both the base section and the fixation part can be connected to a wide range of different positions on the access member or on the frame, respectively, as the case may be. This enables very easy installation and enables the arrangement to be used with a wide range of access member systems, e.g. having door leaves with different sizes and/or weights. In many prior art door closers in contrast, the arm between the frame and the door leaf needs to be adapted for the specific door system, e.g. taking weight and size of the door leaf into account.

Moreover, the flexibility of the elongated element enables a wide range of kinematic options. This in turn enables the arrangement to be optimized in various ways, for example to reduce size, to provide a desired control of movements of the access member, and to handle access members of a wide range of weights and sizes. Moreover, this enables a wide range of installation positions of the arrangement with respect to the access member system. For example, the base section can be installed on the access member, inside the access member, on the frame or inside the frame, e.g. for both left handed and left handed access members. Due to the flexibility of the elongated element, the arrangement can be made far more compact than a prior art door closer comprising a hydraulic cylinder.

Furthermore, the base section can be installed on a side of the access member facing away from the frame when the access member is in an open position. In this case, the elongated element may pass through a hole in the access member. Correspondingly, the base section can be installed on a side of the frame facing away from the access member when the access member is in an open position. In this case, the elongated element may pass through a hole in the frame.

Throughout the present disclosure, the arrangement may for example be a door closer. In this case, the arrangement can eliminate some or all of the drawbacks associated with prior art door closers containing oil. The arrangement may also be a door operator, i.e. for controlling both opening and closing of a door. The arrangement according to the present disclosure can be installed in an access member system without needing any external power supply (e.g. outside of the base section). This enables installation at low cost and enables a cost effective arrangement.

The elongated element may be arranged to wind inside the base section during the relative closing movement. The elongated element may be arranged to unwind inside the base section during the relative opening movement. The braking device may be arranged to brake a speed of the elongated element relative to the base section.

As used herein, the base section and the fixation part are said to move towards each other in the relative closing movement also when only the base section moves towards the fixation part or when only the fixation part moves towards the base section. Correspondingly, the base section and the fixation part are said to move away from each other in the relative opening movement also when only the base section moves away from the fixation part or when only the fixation part moves away from the base section.

The base section may comprise a housing, a plate or other rigid support structure. Alternatively, or in addition, the base section may be telescopic. In this case, a length of the base section may be adjusted in dependence of a width of the access member or of the frame. The flexibility of the elongated element enables the arrangement to function with different lengths. When the length of the base section is increased, a path for the elongated element inside the base section can be increased. By making use of the entire width of the access member or of the frame, the arrangement can be made more compact.

The fixation part may for example be a rigid piece to which an end of the elongated element is secured. Alternatively, the fixation part may be constituted by an end of the elongated element.

The arrangement may further comprise an electromagnetic generator having a stator and a rotor. In this case, the elongated element may be arranged to drive the rotor relative to the stator by relative movement between the base section and the fixation part to thereby generate electric energy, and the braking device may be arranged to be electrically powered by the generator. That is, when the rotor is driven to generate electric energy, the generator can electrically power the braking device. By means of such electrically powered braking device, the speed of the relative closing movement can be accurately controlled. Moreover, since the generator generates electric energy by relative movement between the base section and the fixation part, no hardwiring outside the base section is required. The generator may be arranged to generate electric energy during the closing movement, during the opening movement or both.

A further advantage with driving the rotor by means of the elongated element is that a transmission can be eliminated or reduced in size. Many prior art door closers are very bulky inter alia due to the need for a transmission with a high ratio to transmit a movement of an arm to a rotation of a rotor.

The braking device may comprise a control element for changing an electric load of the generator. Examples of such control element include an electric switch and a potentiometer.

The arrangement may further comprise a winding pulley. In this case, the elongated element may be wound around the winding pulley. During the relative opening movement, the elongated element is unwound from the winding pulley, and during the relative closing movement, the elongated element is wound up on the winding pulley. Any rotation of the winding pulley may be transmitted to a rotation of the rotor to harvest electric energy. In order to brake the speed of the relative closing movement, the braking device may brake the elongated element, either directly or via the winding pulley.

The arrangement may further comprise a transmission arranged to transmit a rotation of the winding pulley to a rotation of the rotor. The transmission may be configured to transmit a first rotational speed of the winding pulley to a second rotational speed of the rotor, where the second rotational speed is higher than the first rotational speed. The transmission may comprise a planetary gearing.

The braking device may comprise a friction brake. Examples of such friction brake include a band brake and a centrifugal clutch. In case the braking device comprises a centrifugal clutch and the winding pulley, the arrangement may further comprise a transmission arranged to transmit a rotation of the winding pulley to a rotation of a hub of the centrifugal clutch. The transmission may be configured to transmit a first rotational speed of the winding pulley to a second rotational speed of the hub, where the second speed is higher than the first rotational speed. Also this transmission may comprise a planetary gearing.

The arrangement may further comprise a control system configured to control the braking device to brake the speed of the relative closing movement. In this way, the arrangement can use energy from movements of the access member to control a speed of the closing movement. The arrangement may thus comprise a closed control loop. When the control system controls the braking device, the arrangement becomes less complicated to calibrate, for example in comparison with a prior art door closer where valves of a hydraulic cylinder often need to be manually calibrated.

The control system may comprise various smartness functions. For example, the control system may comprise reading electronics arranged to communicate wirelessly with an external device, such as a mobile phone. The wireless communication may for example be carried out by means of BLE (Bluetooth Low Energy) or RFID (Radio Frequency Identification). In this way, various settings of the arrangement, in particular the braking characteristics of the braking device, can be controlled via an application in a mobile phone.

The control system may further be configured to control the generator to be driven as a motor. By driving the rotor to rotate in one direction, the base section and the fixation part can be forced towards each other in the end of the closing movement (e.g. the last five degrees thereof) by means of the generator to latch an access member to a frame. By driving the rotor to rotate in an opposite direction, the access member can be opened.

The control system may be configured to control the braking device to brake the speed of the relative closing movement in dependence of the speed of the relative closing movement. The braking device may be braked more heavily for higher speeds and less heavily, or not at all, for lower speeds. The speed of the relative closing movement may be determined in various ways, for example based on a rotational speed of the rotor.

The control system may be arranged to be electrically powered by the generator. The arrangement may further comprise an electric energy storage for storing electric energy generated by the generator. The energy storage may comprise a capacitor and/or a battery.

The elongated element may be at least partly elastic such that the elongated element extends when the base section and the fixation part move away from each other to tension the elongated element to thereby force the base section and the fixation part to move towards each other in the relative closing movement. The braking device may be arranged between the fixation part and an elastic part of the elongated element. Thus, by applying the braking device, this elastic part can be prevented from exerting a force to provide the relative closing movement. The elongated element may be at least partly elastic such that a length of the elongated element can be extended at least 2%, such as at least 5%, during the opening movement. The elongated element may comprise a rubber band.

The arrangement may further comprise a mechanical closing force device configured to tension the elongated element to thereby force the base section and the fixation part to move towards each other in the relative closing movement.

The closing force device may comprise a weight arranged to move by a force of gravity acting on the weight to thereby tension the elongated element. The weight moves vertically downwards by gravity and forces the base section and the fixation part towards each other via the elongated element. In this variant, the tension in the elongated element may always be high, i.e. in both open and closed positions of the access member. The weight may have a mass of at least 1 kg and/or less than 10 kg.

The arrangement of this variant may also comprise an electromagnetic generator as described above. The generator may be arranged to generate electric energy during the closing movement, during the opening movement or both. According to one example, the generator is arranged to generate electric energy only during the closing movement. To this end, the arrangement may comprise a freewheel and/or the generator may be single directional.

The arrangement of this variant may also comprise a control element for changing an electric load of the generator as described above. Alternatively, or in addition, the arrangement of this variant may comprise a friction brake.

The closing force device may comprise a spring. Examples of such spring are a coil spring and a torsion spring. In case the elongated element is at least partly elastic, the elastic part of the elongated element may constitute the closing force device.

The arrangement may further comprise a carrier. In this case, the elongated element may be arranged to move the carrier against a force from the closing force device. The carrier may be arranged to move linearly with respect to the base section.

The arrangement may further comprise a carrier pulley connected to the carrier. In this case, the elongated element may be wound around the carrier pulley. The carrier pulley may be rotatable relative to the carrier about a carrier rotation axis. The carrier rotation axis may be the only degree of freedom between the carrier and the carrier pulley.

The generator may be arranged between the fixation part and the carrier pulley along the elongated element. Alternatively, or in addition, the braking device may be arranged between the fixation part and the carrier pulley along the elongated element.

The arrangement may further comprise a magnet arranged to force the base section and the fixation part towards each other by means of magnetic force. The magnet may be a permanent magnet. The magnet may be provided in the base section.

In case the arrangement comprises a carrier as described herein, the magnet may be arranged to force the carrier in a direction that tensions the elongated element by means of magnetic force.

The arrangement may further comprise a magnetic target section having a substantially constantly decreasing, or constantly decreasing, cross-sectional area in a direction towards the magnet. The magnet may be configured to magnetically force the magnetic target section. The magnetic target section may comprise a permanent magnet or a ferromagnetic material. The magnetic target section may be fixed to the carrier and the magnet may be fixed to the base section. Alternatively, the magnetic target section may be fixed to the base section and the magnet may be fixed to the carrier.

The arrangement may further comprise a mechanical opening force device configured to force the base section and the fixation part away from each other. By means of the opening force device, the speed of the relative closing movement can be limited. If the arrangement is implemented in an access member system comprising an access member and a frame, the closing force device forces the access member in the closing direction and the opening force device forces the access member in the opening direction. The arrangement may further comprise a hinge for rotationally supporting the access member relative to the frame. In this case, the opening force device may be integrated in the hinge. Such opening force device may be a coil spring or a torsion spring. As a possible alternative, the opening force device may be a blade spring connected to the frame and to the access member.

The opening force device may thus comprise a spring. Examples of such spring are a coil spring, a torsion spring and a blade spring. Throughout the present disclosure, the elongated element may be a wire or a rope.

According to a further aspect, there is provided an access member for moving relative to a frame, the access member comprising an arrangement according to the present disclosure, wherein either the base section or the fixation part is connected to the access member. Throughout the present disclosure, the access member may for example be a door leaf or a window sash.

According to a further aspect, there is provided a frame for an access member, the frame comprising an arrangement according to the present disclosure, wherein either the base section or the fixation part is connected to the frame.

According to a further aspect, there is provided an access member system comprising a frame, an access member movable relative to the frame, and an arrangement according to the present disclosure, wherein the base section is connected to either the access member or the frame, and wherein the fixation part is connected to the other of the access member and the frame. Thus, when the fixation part is connected to the access member, the base section is connected to the frame. When the fixation part is connected to the frame, the base section is connected to the access member.

The access member system may comprise an arrangement according to the present disclosure having a mechanical opening force device. In this case, the elongated element and the opening force device may be arranged in parallel between the frame and the access member.

According to a further aspect, there is provided a method of controlling movements of an access member relative to a frame, the method comprising providing a base section connected to either the access member or the frame; providing a fixation part connected to the other of the access member and the frame; providing an electromagnetic generator, the generator comprising a stator and a rotor; driving the rotor relative to the stator by means of a flexible elongated element, and by relative movement between the base section and the fixation part, to thereby generate electric energy; tensioning the elongated element to thereby force the base section and the fixation part to move towards each other in a relative closing movement; and braking a speed of the relative closing movement by means of electric energy generated by the generator. The access member, the frame, the base section, the fixation part, the generator and/or the elongated element may be of any type according to the present disclosure.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
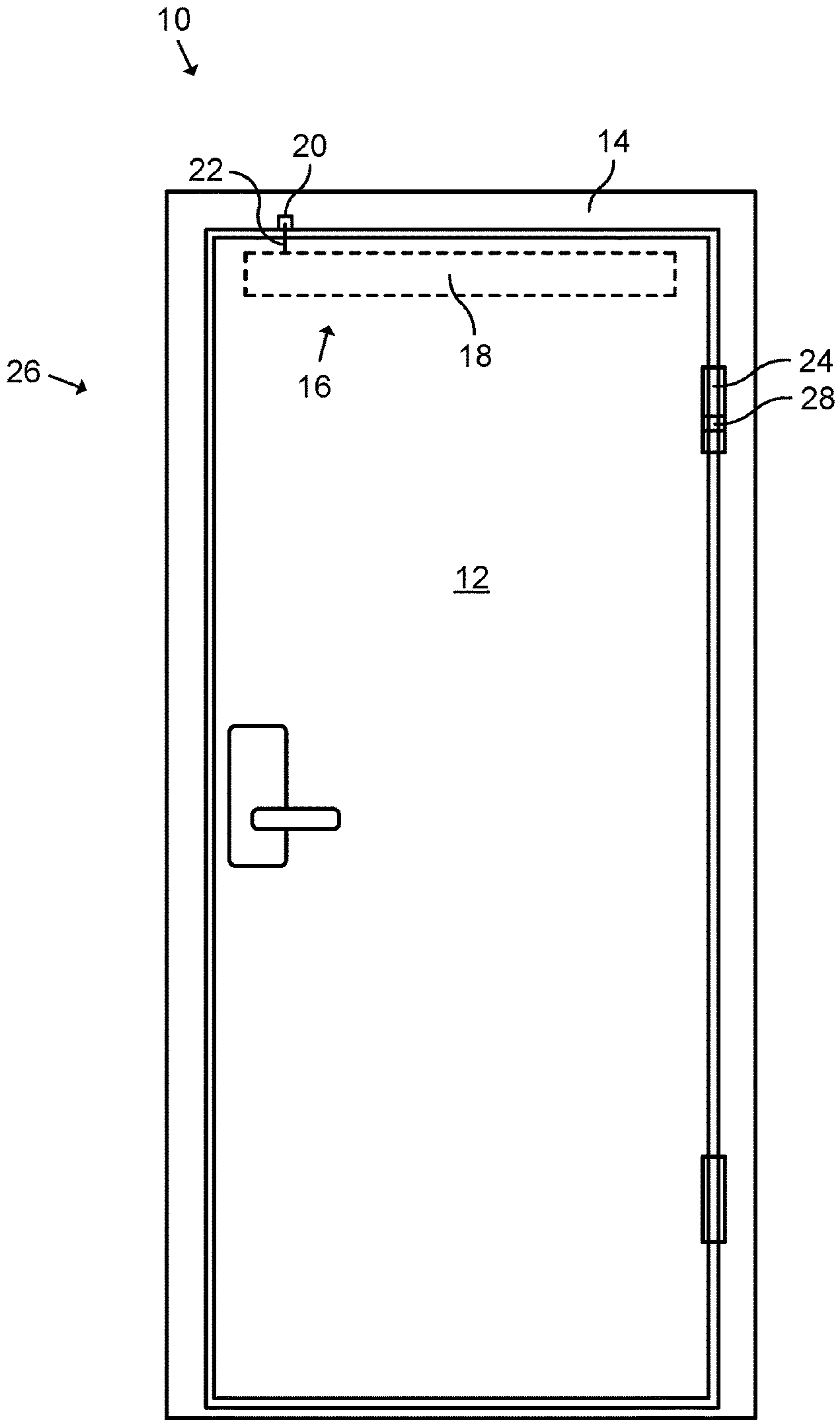
FIG. 1: schematically represents a front view of an access member system comprising an arrangement, a frame and an access member.

In the following, an arrangement comprising a flexible elongated element for controlling movements of an access member relative to a frame, an access member for moving relative to a frame, a frame for an access member, an access member system and a method of controlling movements of an access member relative to a frame, will be described. The same or similar reference numerals will be used to denote the same or similar structural features.

FIG. 1 schematically represents a front view of a door system 10 comprising a door leaf 12 rotatable relative to a frame 14. The door system 10 and the door leaf 12 are examples of an access member system and an access member, respectively, according to the present disclosure.

The door system 10 comprises an arrangement 16. The arrangement 16 is configured to control movements of the door leaf 12 relative to the frame 14. The arrangement 16 comprises a base section 18, a fixation part 20 and a flexible wire 22 between the base section 18 and the fixation part 20. The wire 22 is one example of a flexible elongated element according to the present disclosure. In the example in FIG. 1, the base section 18 is connected to the door leaf 12 and the fixation part 20 is connected to the frame 14. The fixation part 20 of this example is a rigid piece secured to the frame 14, e.g. by means of screws (not shown).

The door system 10 further comprises two hinges 24. By means of the hinges 24, the door leaf 12 is rotatable relative to the frame 14. In FIG. 1, the door leaf 12 is in a closed position 26.

The arrangement 16 further comprises an opening spring 28. The opening spring 28 is one example of a mechanical opening force device according to the present disclosure. The opening spring 28 is in this example integrated in the upper hinge 24. The opening spring 28 and the wire 22 are thereby arranged in parallel between the frame 14 and the door leaf 12.

Figure 2:
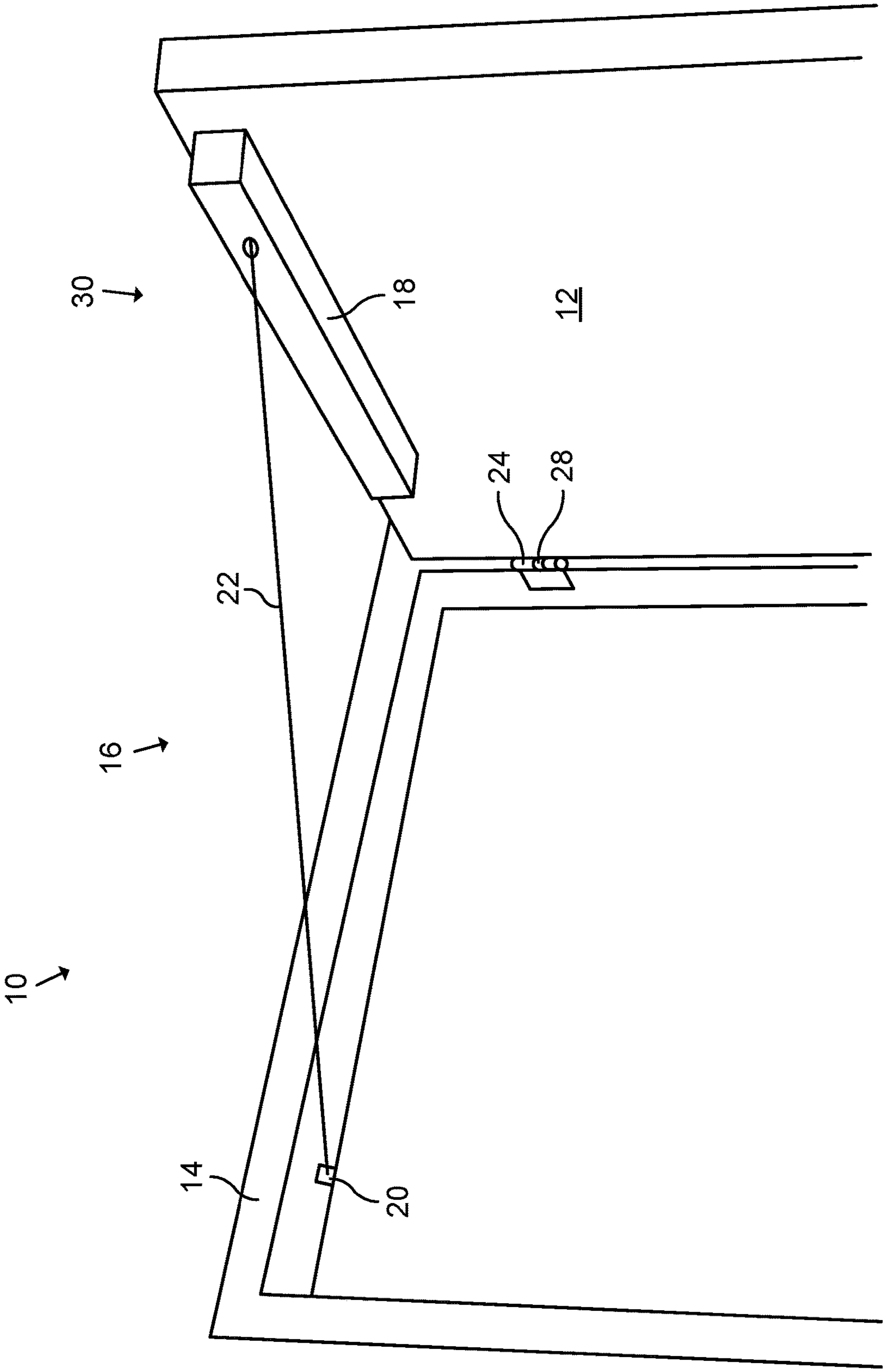
FIG. 2: schematically represents a perspective view of the access member system in FIG. 1 when the access member is in an open position.

FIG. 2 schematically represents a perspective view of the door system 10 in FIG. 1. In FIG. 2, the door leaf 12 is in an open position 30. As shown in FIG. 2, the base section 18 is connected to a side of the door leaf 12 facing the frame 14 when the door leaf 12 is in the open position 30. The wire 22 extends in a straight line between the base section 18 and the fixation part 20.

Figure 3:
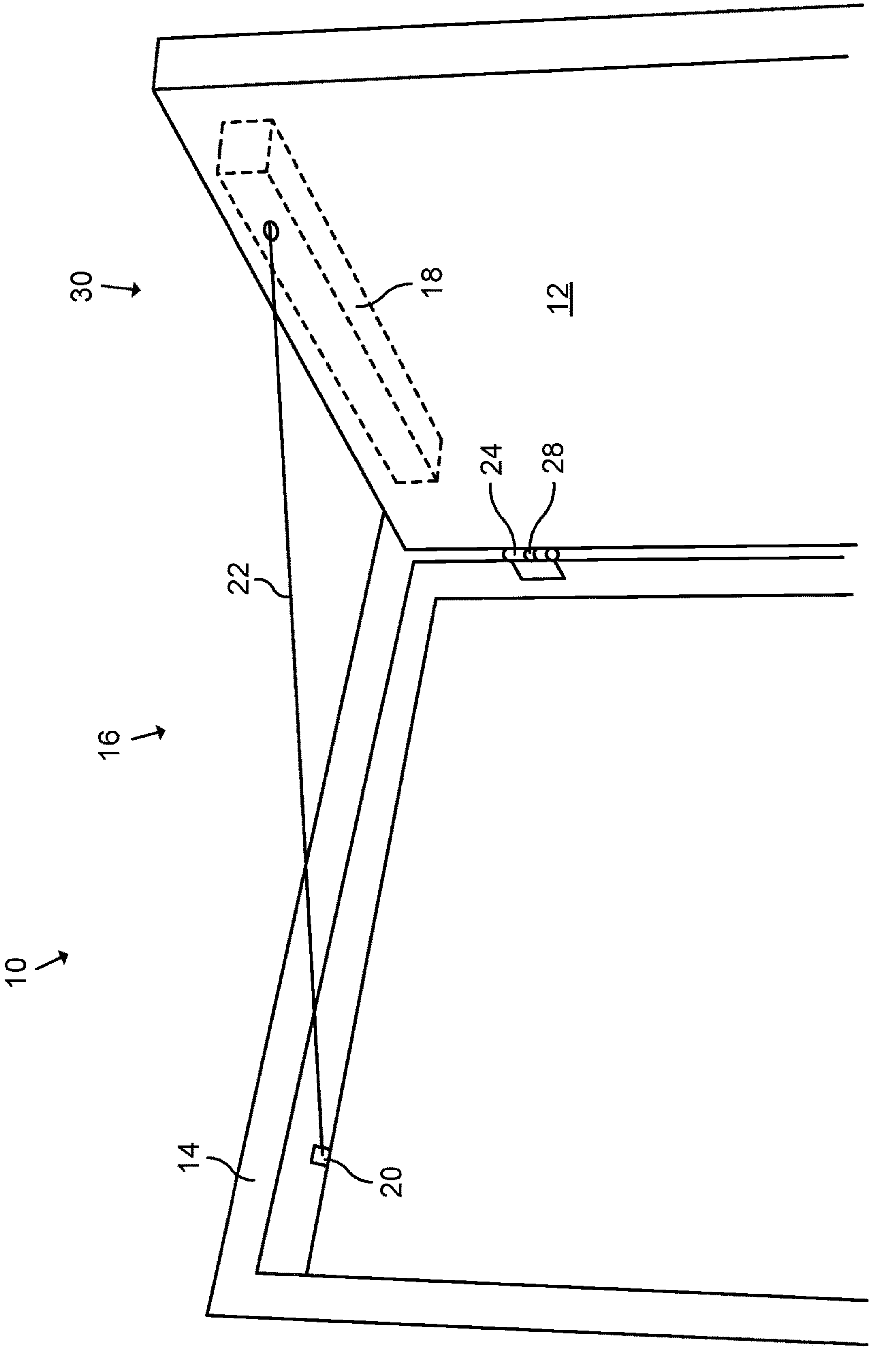
FIG. 3: schematically represents a perspective view of the access member system comprising an alternative configuration of the arrangement.

FIG. 3 schematically represents a perspective view of the door system 10 comprising an alternative configuration of the arrangement 16. The arrangement 16 in FIG. 3 differs from FIGS. 1 and 2 in that the base section 18 is integrated into the door leaf 12.

Figure 4:
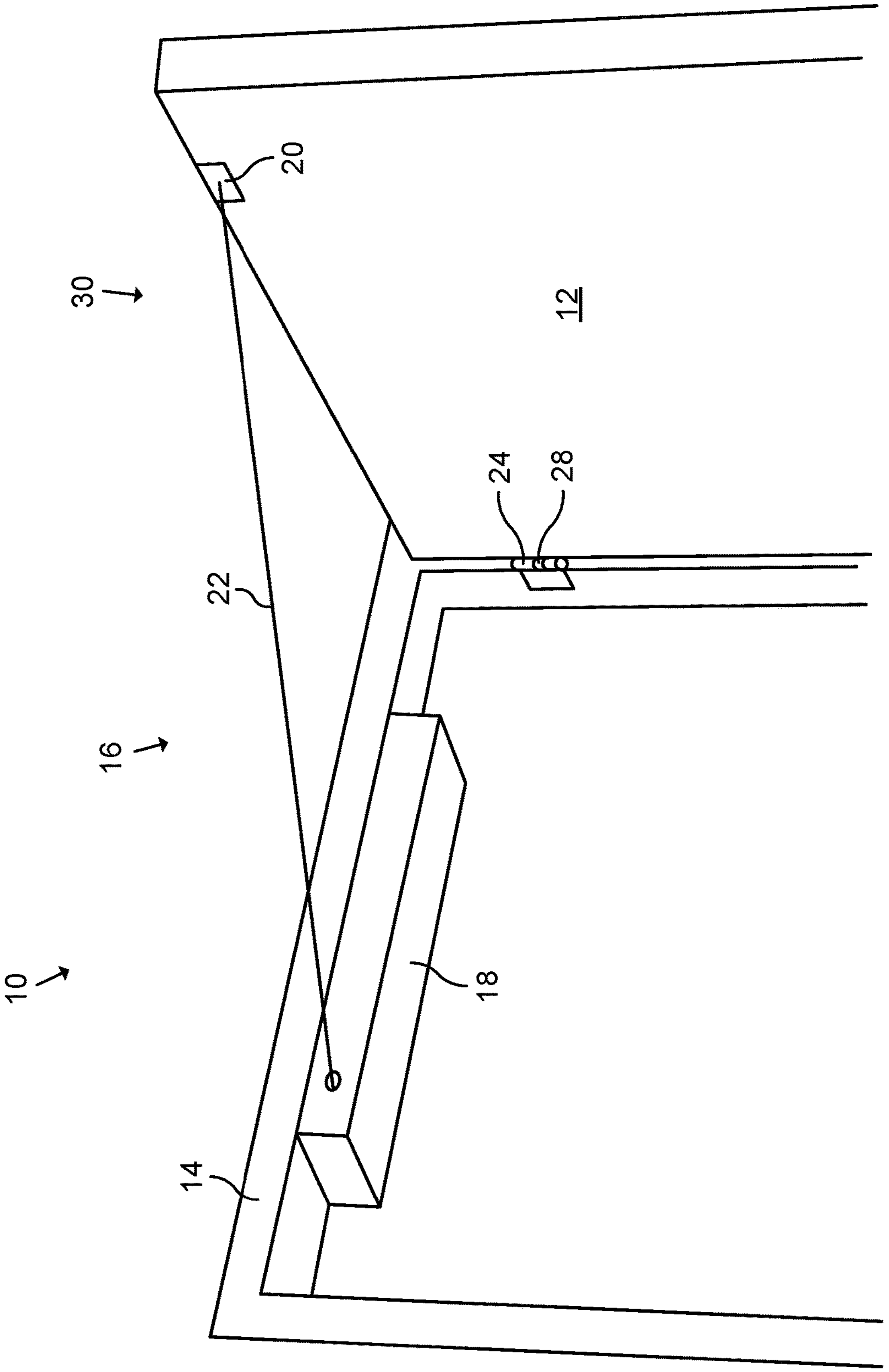
FIG. 4: schematically represents a perspective view of the access member system comprising an alternative configuration of the arrangement.

FIG. 4 schematically represents a perspective view of the door system 10 comprising an alternative configuration of the arrangement 16. The arrangement 16 in FIG. 4 differs from FIGS. 1-3 in that the base section 18 is connected to the frame 14 and the fixation part 20 is connected to the door leaf 12.

Figure 5:
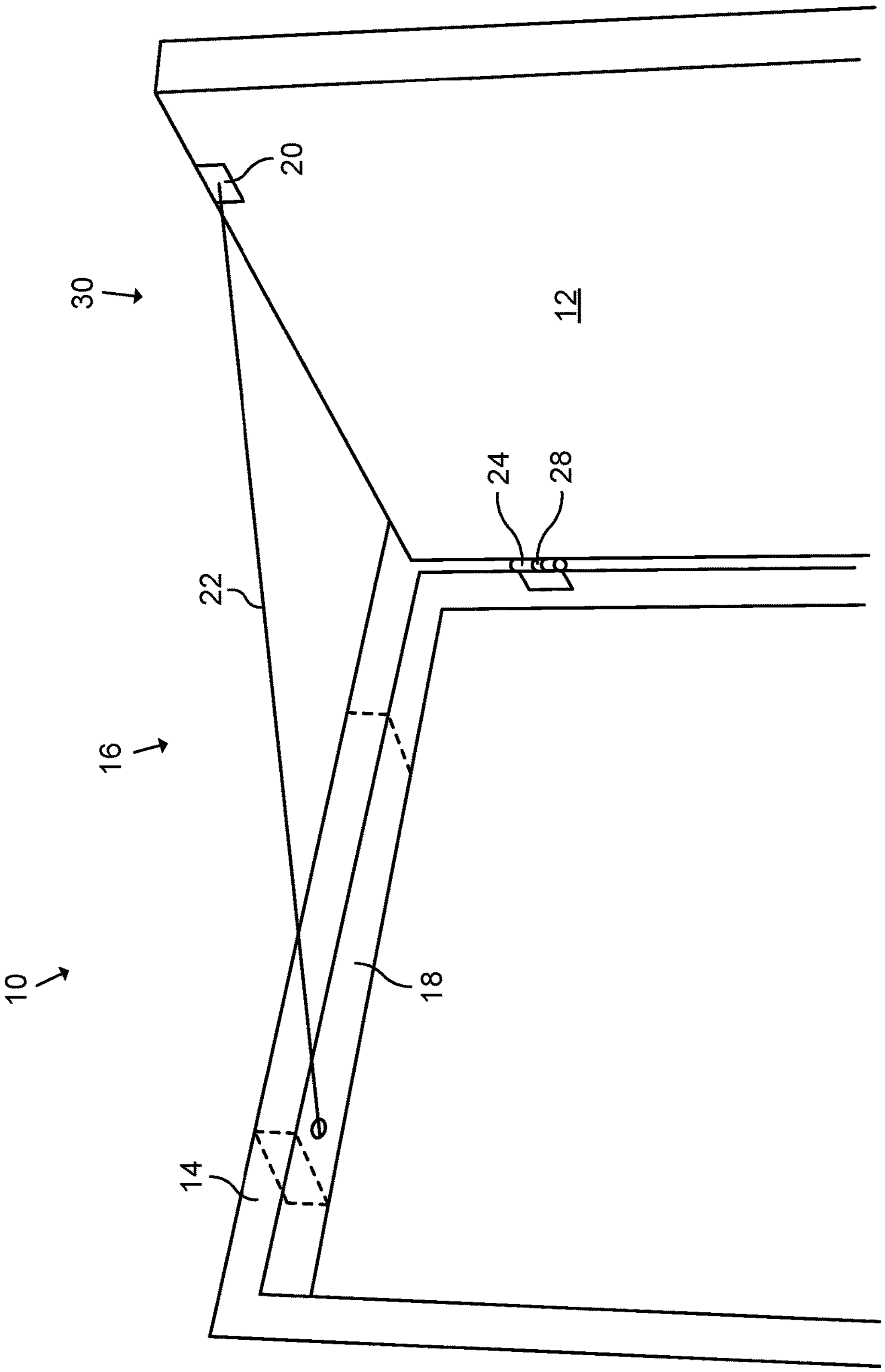
FIG. 5: schematically represents a perspective view of the access member system comprising an alternative configuration of the arrangement.

FIG. 5 schematically represents a perspective view of the door system 10 comprising an alternative configuration of the arrangement 16. The arrangement 16 in FIG. 5 differs from FIG. 4 in that the base section 18 is integrated into the frame 14.

Figure 6:
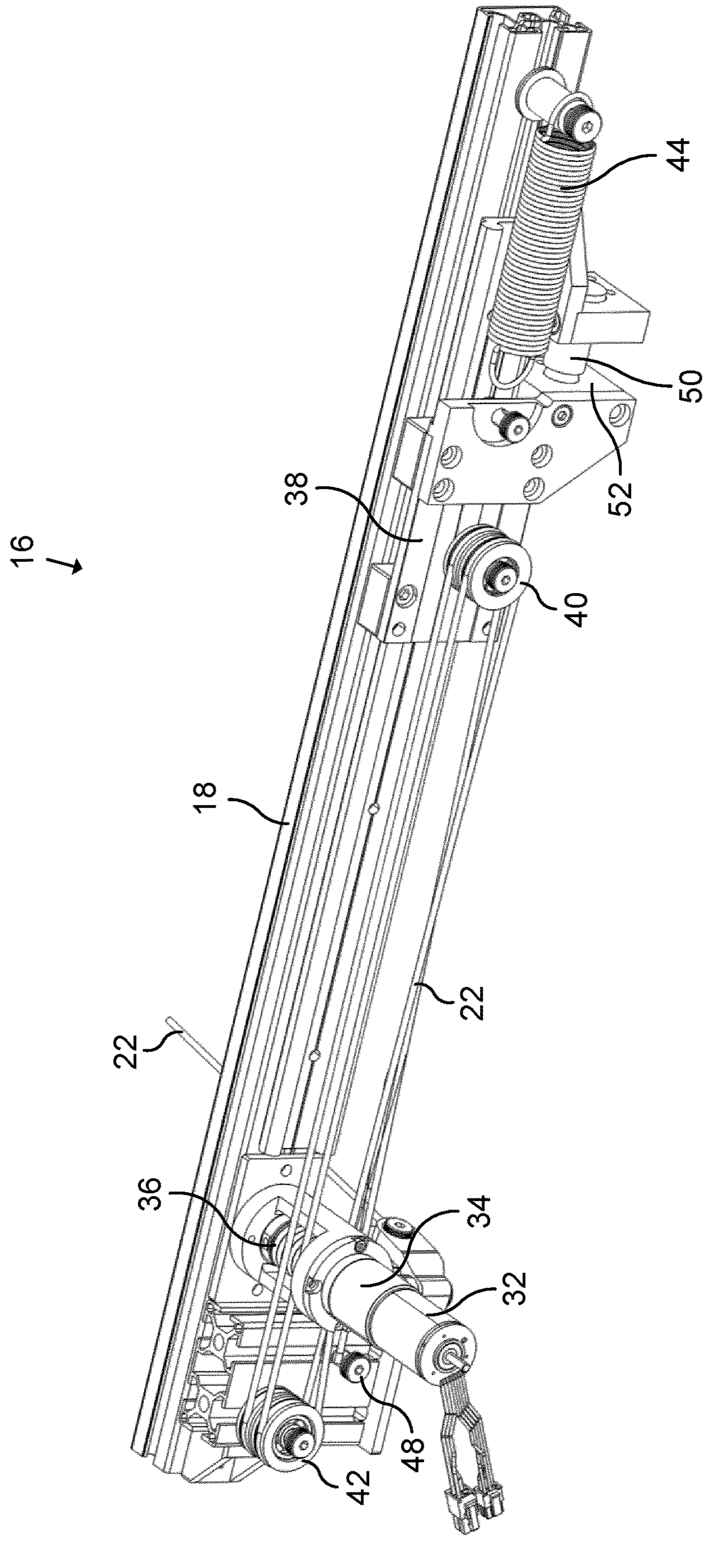
FIG. 6: schematically represents a partial perspective front view of the arrangement.
Figure 7:
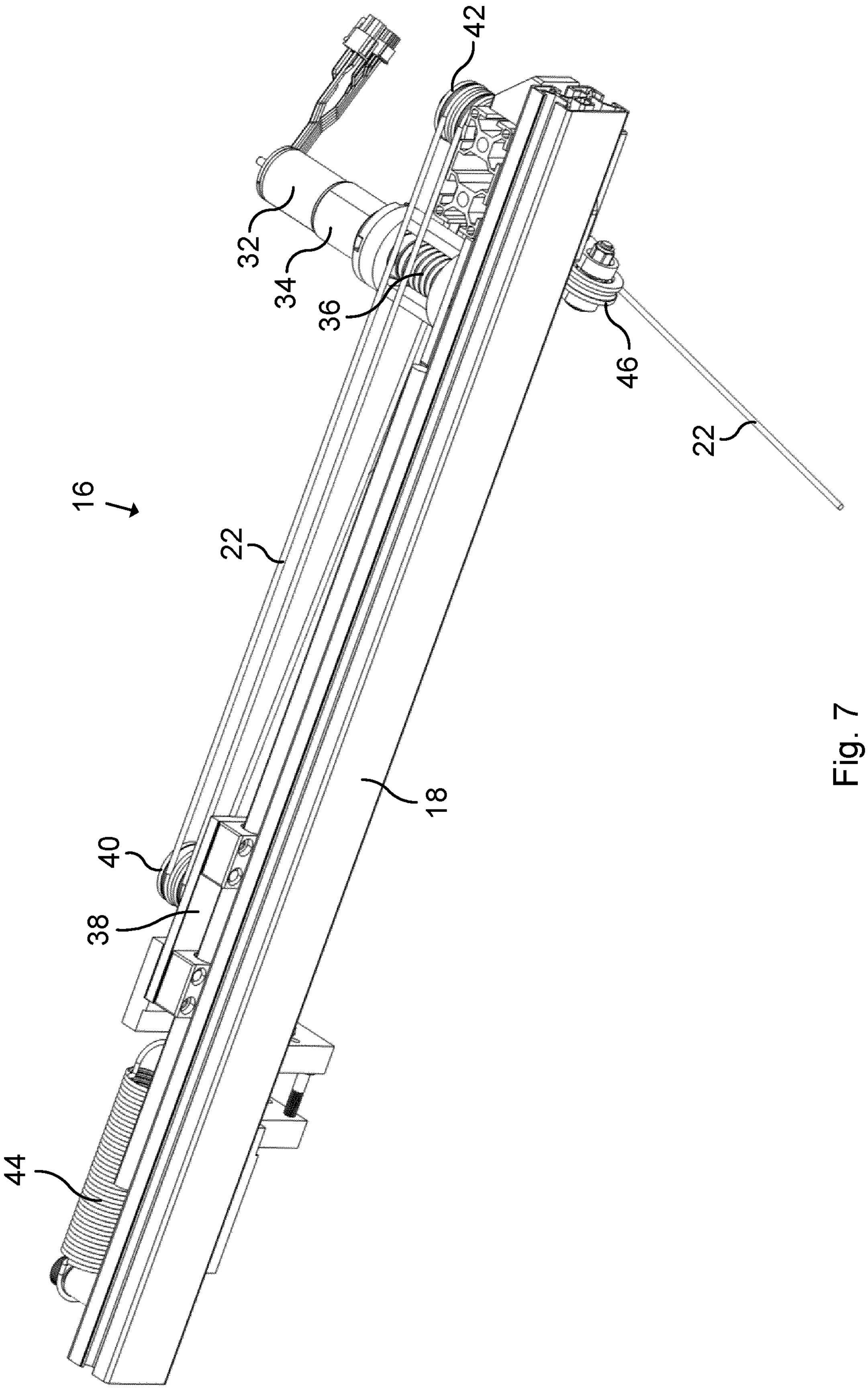
FIG. 7: schematically represents a partial perspective rear view of the arrangement.

FIG. 6 schematically represents a partial perspective front view of the arrangement 16, and FIG. 7 schematically represents a partial perspective rear view of the arrangement 16. With collective reference to FIGS. 6 and 7, the arrangement 16 is illustrated in a state when the door leaf 12 is in the closed position 26. As shown in FIGS. 6 and 7, the base section 18 comprises a support plate.

The arrangement 16 of this example further comprises an electromagnetic generator 32, a transmission 34 and a winding pulley 36. In this example, the generator 32, the transmission 34 and the winding pulley 36 are concentrically arranged. The winding pulley 36 of this example is rotatable relative to the base section 18 about a rotation axis that constitutes the only degree of freedom between the winding pulley 36 and the base section 18.

The arrangement 16 of this example further comprises a carrier 38. The carrier 38 of this example is linearly movable along rails (not denoted) in the base section 18. In this example, the linear movement of the carrier 38 relative to the base section 18 is the only degree of freedom between the carrier 38 and the base section 18.

The arrangement 16 of this example further comprises a carrier pulley 40. The carrier pulley 40 is connected to the carrier 38 and is rotatable relative to the carrier 38 about a rotation axis that constitutes the only degree of freedom between the carrier pulley 40 and the carrier 38.

The arrangement 16 of this example further comprises a base pulley 42. The base pulley 42 of this example is rotatable relative to the base section 18 about a rotation axis that constitutes the only degree of freedom between the base pulley 42 and the base section 18. The winding pulley 36 is arranged between the base pulley 42 and the carrier 38.

The arrangement 16 of this example further comprises a closing spring 44. The closing spring 44 is one example of a mechanical closing force device according to the present disclosure. The closing spring 44 is here exemplified as a coil spring. One end of the closing spring 44 is connected to the base section 18 and the other end of the closing spring 44 is connected to the carrier 38 (although not illustrated in FIGS. 6 and 7). The carrier 38 is arranged between the winding pulley 36 and the closing spring 44.

The arrangement 16 of this example further comprises a guide pulley 46. The guide pulley 46 serves to guide the wire 22 during opening and closing of the door leaf 12.

The arrangement 16 of this example further comprises a fixing member 48. The fixing member 48 serves to fix the wire 22 to the base section 18. In this example, the fixing member 48 is arranged between the base pulley 42 and the winding pulley 36.

The wire 22 is wound around the winding pulley 36. In the specific example in FIGS. 6 and 7, the wire 22 is wound six full turns around the winding pulley 36. The wire 22 then extends to the base pulley 42 and is wound half a turn around the base pulley 42. The wire 22 then extends to the carrier pulley 40 and is wound half a turn around the carrier pulley 40. The wire 22 then again extends to the base pulley 42 and is wound half a turn around the base pulley 42. The wire 22 then again extends to the carrier pulley 40 and is wound half a turn around the carrier pulley 40. The wire 22 then extends to the fixing member 48 by means of which an end of the wire 22 is fixed to the base section 18. The generator 32 and the winding pulley 36 are thus arranged between the fixation part 20 and the carrier pulley 40 along a path of the wire 22.

In the state of the arrangement 16 in FIGS. 6 and 7, the closing spring 44 pulls the carrier 38. The wire 22 is thereby tensioned.

The arrangement 16 of this example further comprises a magnet 50 and a magnetic target section 52. The magnet 50 is fixed to the base section 18. The magnetic target section 52 is fixed to the carrier 38. The magnet 50 is here exemplified as a permanent magnet. The magnetic target section 52 is here exemplified as a section comprising a ferromagnetic material. In the position of the arrangement 16 in FIGS. 6 and 7, the magnet 50 attracts the magnetic target section 52 by means of a magnetic force. The magnet 50 thereby forces the carrier 38 in a direction that tensions the wire 22.

Figure 8:
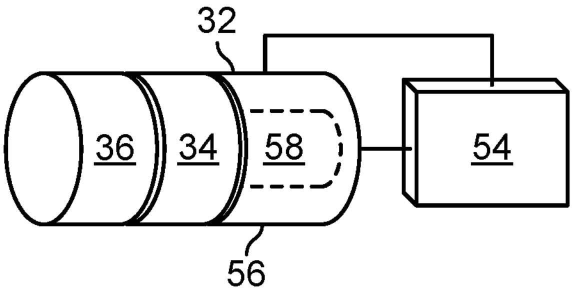
FIG. 8: schematically represents a side view of a winding pulley, a transmission, a generator and a control system of the arrangement.

FIG. 8 schematically represents a side view of the winding pulley 36, the transmission 34, the generator 32 and a control system 54 of the arrangement 16. The generator 32 comprises a stator 56 and a rotor 58 rotatable relative to the stator 56. In this example, the winding pulley 36 is coupled to the rotor 58 by means of the transmission 34 such that the rotor 58 always rotates when the winding pulley 36 rotates. In this way, the wire 22, wound around the winding pulley 36, is arranged to drive the rotor 58 relative to the stator 56 by relative movement between the base section 18 and the fixation part 20.

Figure 9:
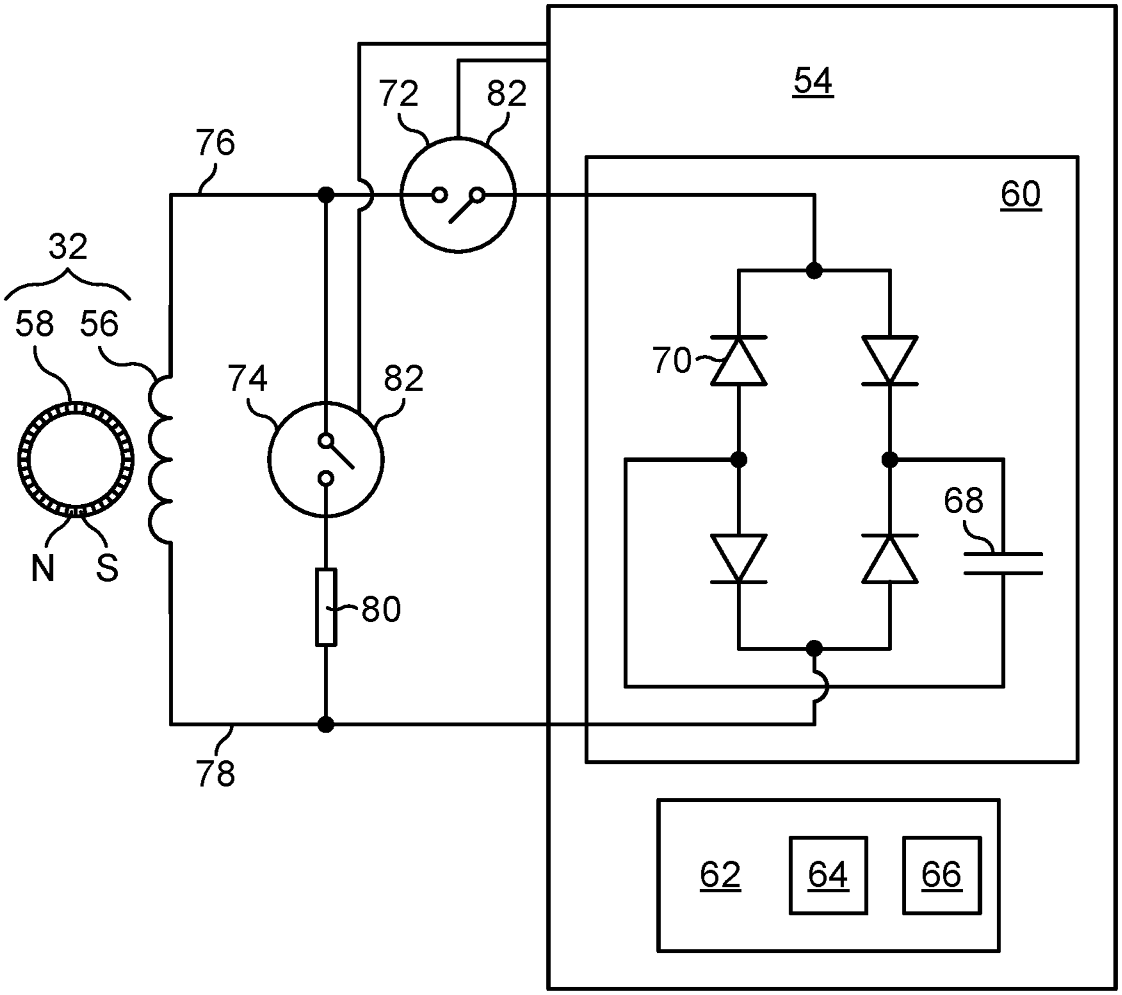
FIG. 9: schematically represents the generator, the control system and examples of braking devices.

FIG. 9 schematically represents the generator 32 and the control system 54. When the winding pulley 36 rotates, the rotor 58 rotates relative to the stator 56 and the generator 32 generates electric energy. Due to the transmission 34, the rotor 58 rotates at a higher rotational speed than the rotational speed of the winding pulley 36.

The control system 54 is electrically powered by the generator 32. Thus, electric energy harvested by rotation of the winding pulley 36 is used to electrically power the control system 54. The generator 32 and the control system 54 are connected by means of electric conductors (not denoted), for example electric cables.

The control system 54 of the specific example in FIG. 9 comprises power management electronics 60 and a microcontroller 62. The microcontroller 62 comprises a data processing device 64 and a memory 66. A computer program is stored in the memory 66. The computer program comprises program code which, when executed by the data processing device 64 causes the data processing device 64 to perform, or command performance of, various steps as described herein.

The power management electronics 60 in FIG. 9 comprises energy harvesting electronics including an electric energy storage, here exemplified as a capacitor 68, and four diodes 70 arranged in a diode bridge. The diodes 70 are arranged to rectify the voltage from the generator 32.

The arrangement 16 further comprises a disconnection switch 72 and a shorting switch 74. The disconnection switch 72 and the shorting switch 74 are each an example of a control element according to the present disclosure. The disconnection switch 72 and the shorting switch 74 are electrically powered by the generator 32.

Each of the disconnection switch 72 and the shorting switch 74 is controlled by the control system 54, more specifically by the microcontroller 62. FIG. 9 further shows a positive line 76 and a ground line 78. The positive line 76 and the ground line 78 are connected to respective terminals of the generator 32. In this example, the disconnection switch 72 is provided on the positive line 76. Each of the disconnection switch 72 and the shorting switch 74 may be implemented using a transistor, such as a MOSFET (Metal Oxide Semiconductor Field Effect Transistor).

The disconnection switch 72 is arranged to selectively disconnect the generator 32. When the disconnection switch 72 is open, the electric resistance becomes high, and the winding pulley 36 rotates lightly, in comparison with when the winding pulley 36 is rotated to harvest electric energy.

The shorting switch 74 is arranged to selectively short-circuiting the terminals of the generator 32 over an electric resistor 80. When the shorting switch 74 is closed, the harvested electric energy is converted to heat in the electric resistor 80. The winding pulley 36 thereby rotates heavily in comparison with when the winding pulley 36 is rotated to harvest electric energy. Thus, when the shorting switch 74 is closed, a high counter torque is provided in the generator 32, making the rotor 58 heavy to rotate by rotation of the winding pulley 36.

By selectively controlling the disconnection switch 72 and the shorting switch 74, the control system 54 can selectively change an electric load of the generator 32 in order to brake the winding pulley 36. Each of the disconnection switch 72 and the shorting switch 74 is therefore an example of a braking device 82 according to the present disclosure.

Figure 10:
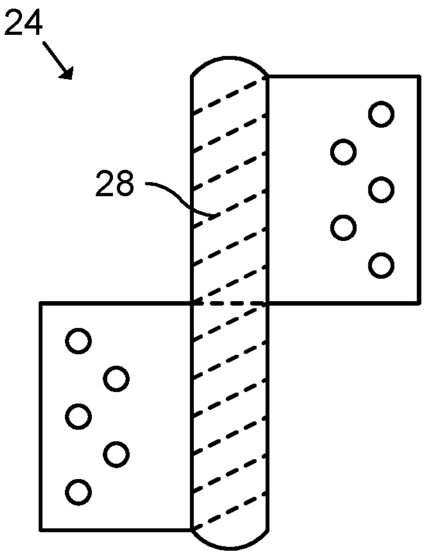
FIG. 10: schematically represents a hinge comprising an opening force device.

FIG. 10 schematically represents the upper hinge 24 in FIGS. 1-5. As mentioned, the opening spring 28 is integrated into the hinge 24. The opening spring 28 is arranged to force the door leaf 12 in an opening direction away from the frame 14. The opening spring 28 is thereby also arranged to force the base section 18 and the fixation part 20 away from each other. The opening spring 28 in FIG. 10 is a torsion spring.

Figure 11:
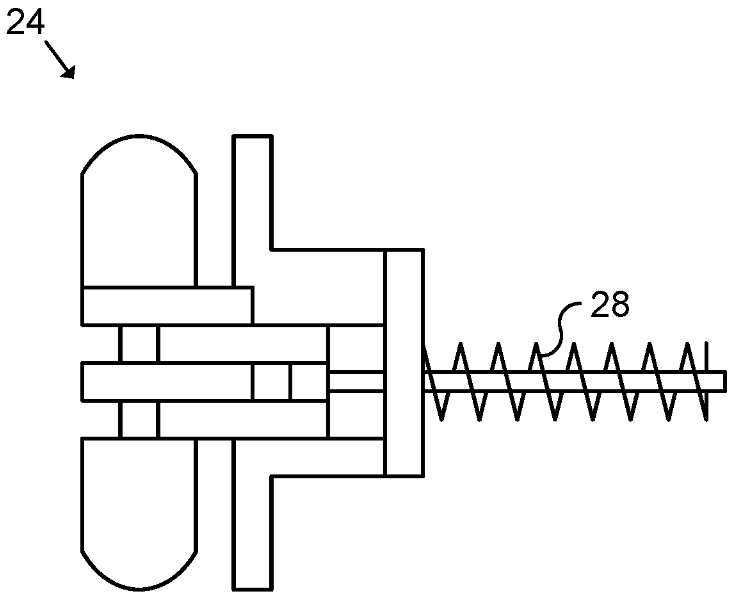
FIG. 11: schematically represents a further example of a hinge comprising a further example of an opening force device.

FIG. 11 schematically represents a further example of a hinge 24 comprising a further example of an opening spring 28. The hinge 24 in FIG. 11 comprises an opening spring 28 constituted by a compression coil spring. Also the opening spring 28 in FIG. 11 is arranged to force the door leaf 12 in the opening direction away from the frame 14.

Figure 12:
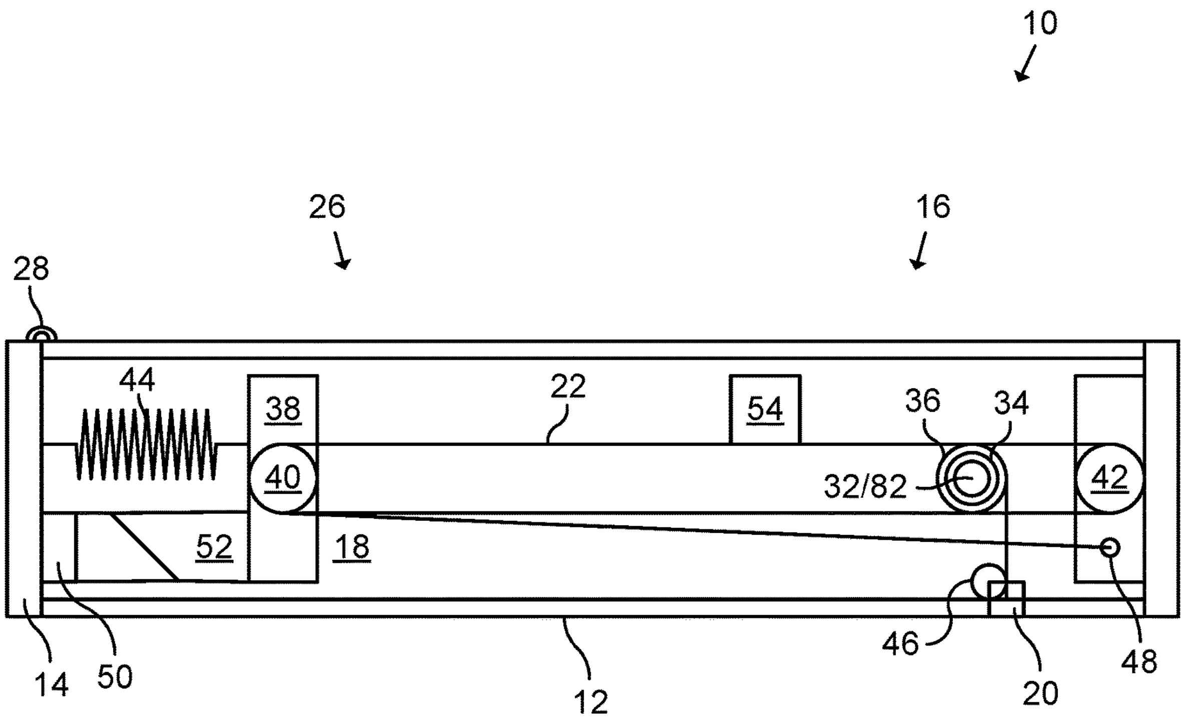
FIG. 12: schematically represents a top view of the access member system in FIG. 3 when the access member is in a closed position.

FIG. 12 schematically represents a top view of the door system 10 in FIG. 3 when the door leaf 12 is in a closed position 26. In FIG. 12, the closing spring 44 is deformed and forces the carrier 38 (to the left in FIG. 12). The carrier 38 thereby tensions the wire 22. The magnet 50 attracts the magnetic target section 52 such that these two parts are brought into contact. In order to open the door leaf 12, the user therefore initially needs to overcome both the force from the magnet 50 and from the closing spring 44.

In FIG. 12, the opening spring 28 is deformed and thereby exerts a force on the door leaf 12 to open the same. However, the forces from the magnet 50 and the closing spring 44 overcome the force from the opening spring 28 in FIG. 12.

Figure 13:
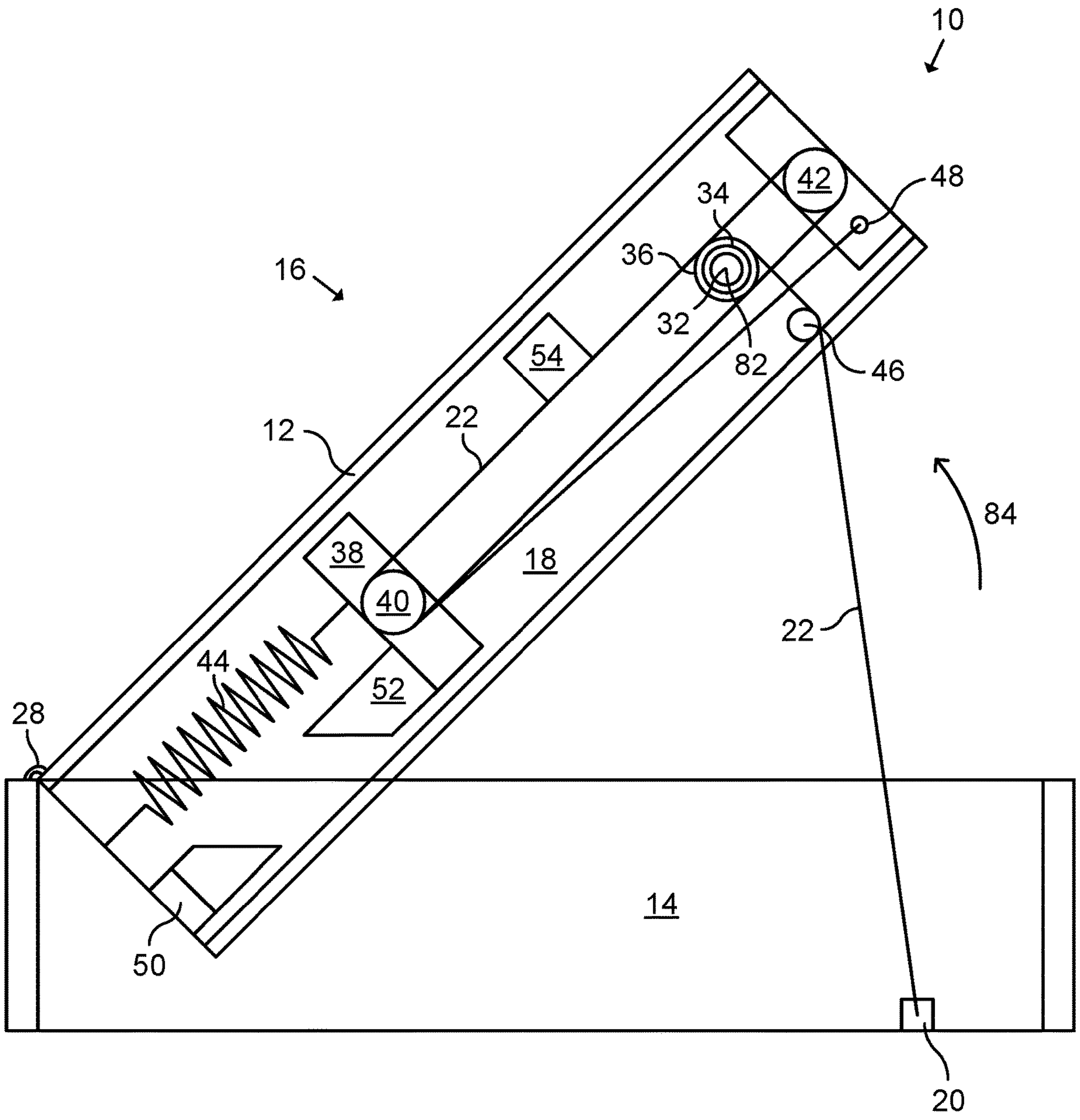
FIG. 13: schematically represents a top view of the access member system in FIG. 12 during opening of the access member.

FIG. 13 schematically represents a top view of the door system 10 in FIG. 12 during opening of the door leaf 12. In FIG. 13, the door leaf 12 moves away from the frame 14 in a relative opening movement 84. When the door leaf 12 moves away from the frame 14, the wire 22 is unwound from the winding pulley 36 and the winding pulley 36 is driven by the wire 22 to rotate (in the clockwise direction in FIG. 13). The rotation of the winding pulley 36 may be used by the generator 32 to harvest electric energy. Since the wire 22 is wound around the relatively small winding pulley 36, the winding pulley 36 rotates with relatively high speed.

The unwinding of the wire 22 from the winding pulley 36 causes the carrier 38 to be pulled towards the winding pulley 36 by means of the wire 22. As shown in FIG. 13, this movement of the carrier 38 stretches the closing spring 44 and thereby further tensions the wire 22. Moreover, this movement of the carrier 38 has now caused the magnetic target section 52 to be distanced from the magnet 50. The magnetic force from the magnet 50 acting on the magnetic target section 52 is now very low or negligible. The opening force from the opening spring 28 reduces as the door leaf 12 moves away from the frame 14.

Figure 14:
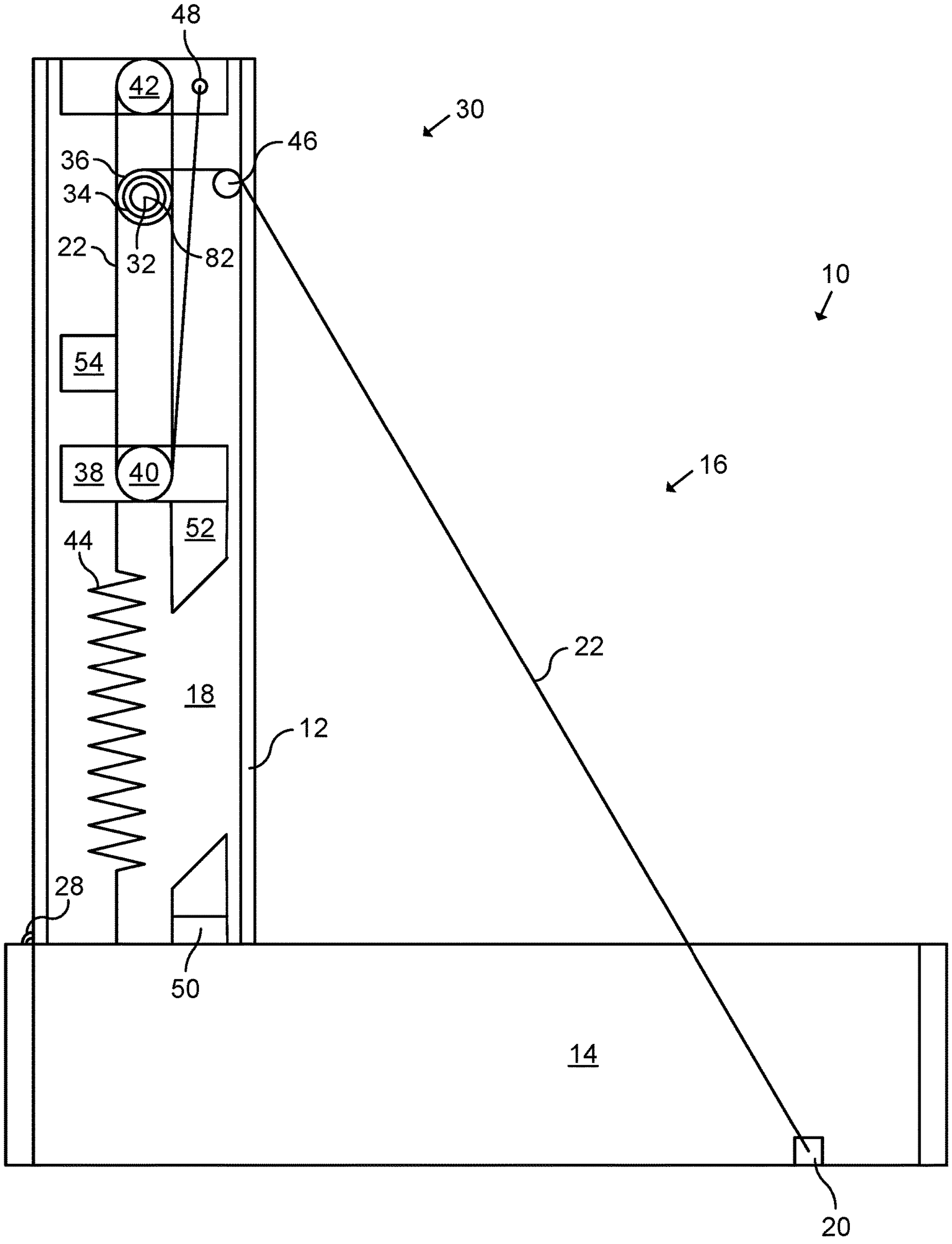
FIG. 14: schematically represents a top view of the access member system in FIGS. 12 and 13 when the access member is in an open position.

FIG. 14 schematically represents a top view of the door system 10 in FIGS. 12 and 13 when the door leaf 12 is in an open position 30. The user now releases the door leaf 12. In the open position 30, the closing spring 44 exerts a relatively high force on the carrier 38. The carrier 38 thereby tensions the wire 22 with a relatively high force. At each position of the door leaf 12 between the closed position 26 and the open position 30, the closing force on the door leaf 12 generated by the closing spring 44 is higher than the opening force on the door leaf 12 generated by the opening spring 28.

Figure 15:
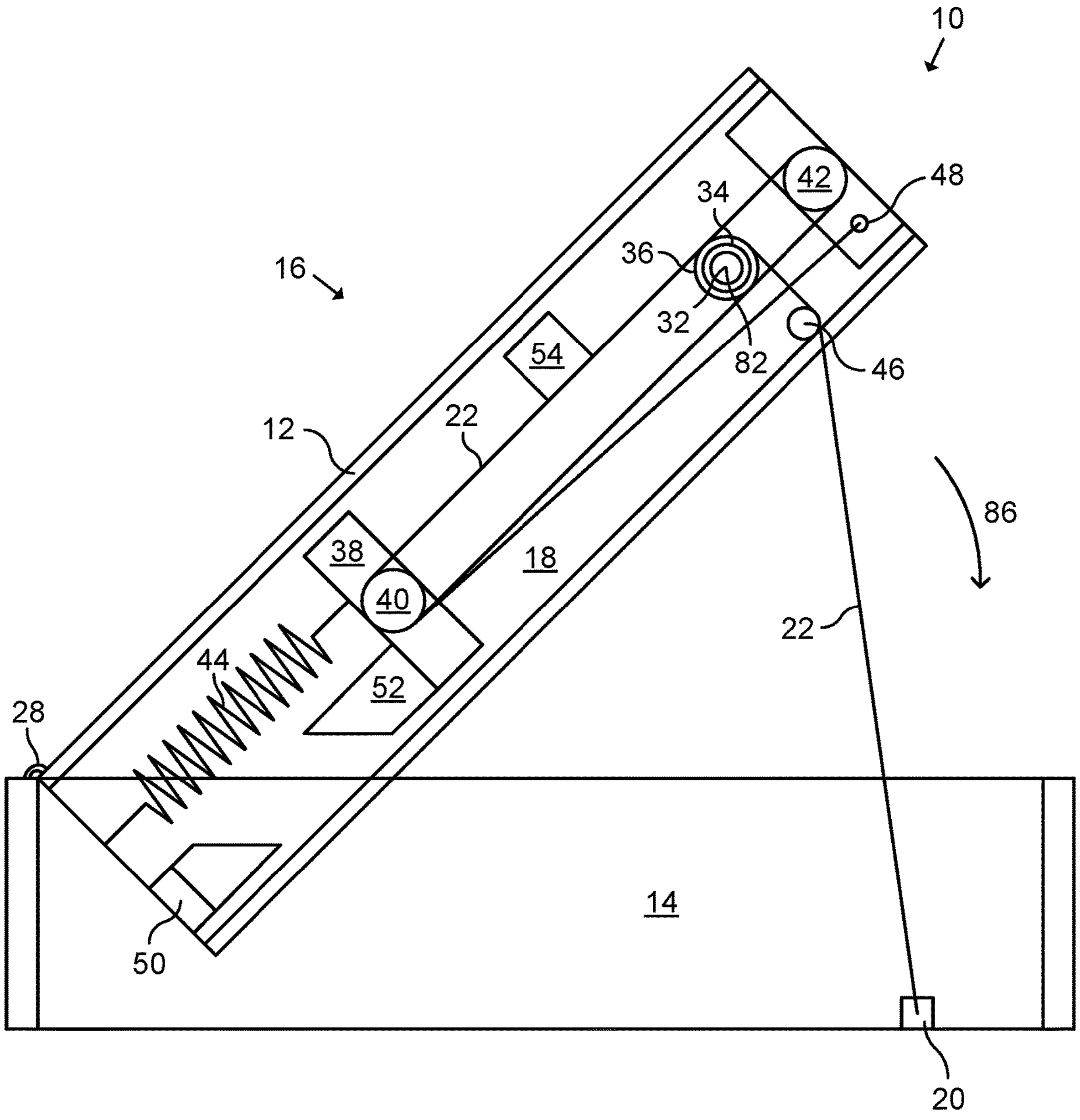
FIG. 15: schematically represents a top view of the access member system in FIGS. 12-14 during closing of the access member.

FIG. 15 schematically represents a top view of the door system 10 in FIGS. 12-14 during closing of the door leaf 12. When the user has released the door leaf 12, the closing spring 44 pulls the carrier 38. This movement of the carrier 38 causes the wire 22 to be pulled to wind around the winding pulley 36 and the door leaf 12 to move in a relative closing movement 86 towards the frame 14. The closing spring 44 thereby acts to close the door leaf 12. Also this rotation of the winding pulley 36 may be used by the generator 32 to harvest electric energy. Also the base section 18 moves towards the fixation part 20 in the closing movement 86. The opening spring 28 limits the speed of the closing movement 86.

A closing speed of the door leaf 12 can be determined based on a rotational speed of the winding pulley 36 and/or the rotor 58. If the closing speed becomes too high, any of the braking devices 82 may be activated to brake the winding pulley 36 by means of an increased electric load on of the generator 32. In this example, the electric load on the generator 32 is controlled to provide a braking force on the winding pulley 36. When the winding pulley 36 is braked, movement of the wire 22 relative to the base section 18 is braked and the tension in the wire 22 between the winding pulley 36 and the fixation part 20 is reduced. The opening effect from the opening spring 28 will counteract the closing movement 86 to a larger extent the more this tension in the wire 22 is reduced. Also friction in the hinges 24 will counteract the closing movement 86. If for example the door leaf 12 is exposed to a sudden wind acting to close the door leaf 12, the opening spring 28 reduces the effect of such wind. Thus, when any of the braking devices 82 is applied, a speed of the closing movement 86 of the door leaf 12 will be reduced.

In the last part of the closing movement 86, for example the last five degrees, the magnetic target section 52 comes sufficiently close to the magnet 50 to be attracted by the magnet **5*o*. In addition to the force from the closing spring 44, which decreases during the closing movement 86, the magnetic force from the magnet 5*o* on the magnetic target section 52 additionally pulls the carrier 38. This causes an additional pull in the wire 22 such that an additional latching force is provided to reliably close the door leaf 12. Optionally, the generator 32 can be driven as a motor during the last phase of the closing movement 86** to further increase the latching force to provide an even more effective latching.

Figure 16:
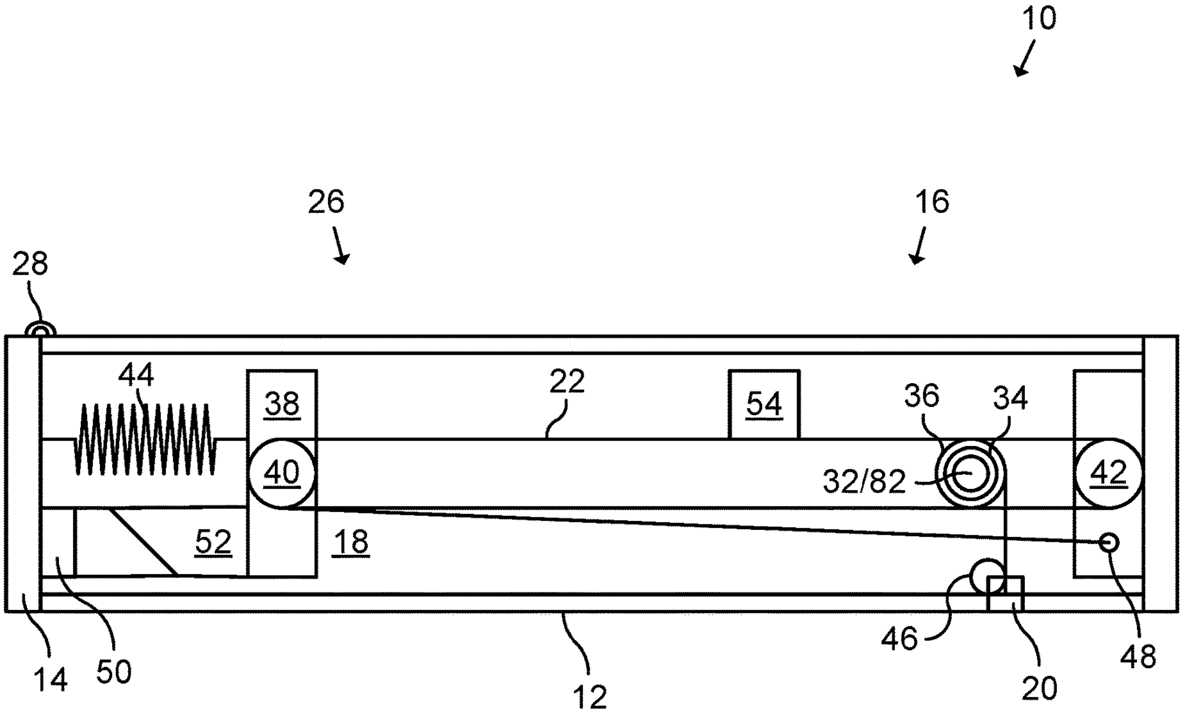
FIG. 16: schematically represents a top view of the access member system in FIGS. 12-15 when the access member has returned to the closed position.

FIG. 16 schematically represents a top view of the door system 10 in FIGS. 12-15 when the door leaf 12 has returned to the closed position 26. The generator 32 can be driven as a motor (e.g. in the clockwise direction in FIG. 16) to open the door leaf 12. That is, when the rotor 58 is driven in the clockwise direction in FIG. 16, the length of wire 22 between the winding pulley 36 and the fixation part 20 is increased and the opening spring 28 forces the door leaf 12 to open correspondingly.

Figure 17:
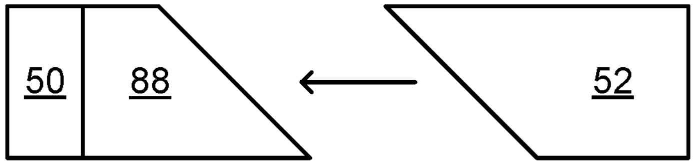
FIG. 17: schematically represents a side view of a magnet and a magnetic target section.
Figure 18:
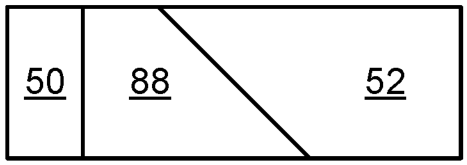
FIG. 18: schematically represents a further side view of the magnet and the magnetic target section in FIG. 17.

FIGS. 17 and 18 schematically represent side views of the magnet **5*o* and the magnetic target section 52. In FIG. 17, the magnetic target section 52 is sufficiently close to the magnet 5*o* to be attracted by the magnet 5*o*. This is the case during an initial phase of the opening movement 84 and during a final phase of the closing movement 86**.

As shown in FIG. 17, the magnetic target section 52 has a constantly decreasing cross-sectional area in a direction towards the magnet **5*o*. Also a body 88 housing the magnet 5*o* comprises a decreasing cross-sectional area in a direction towards the magnetic target section 52. The profiles of the body 88 and of the magnetic target section 52 provide a well calibrated latching force in the final closing movement 86 of the door leaf 12. In FIG. 18, the magnetic target section 52 is brought into contact with the body 88. As shown in FIG. 18, the profiles of the body 88 and the magnetic target section 52** provide a mating interface.

Figure 19:
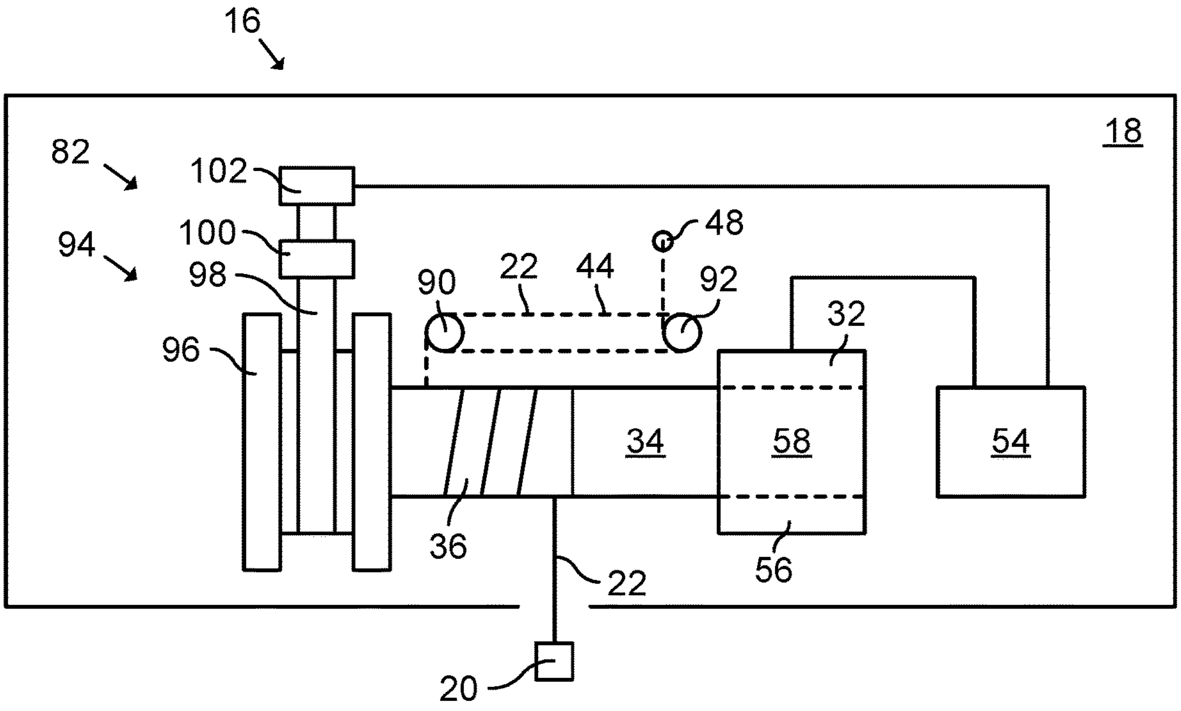
FIG. 19: schematically represents a front view of a further example of an arrangement.
Figure 20:
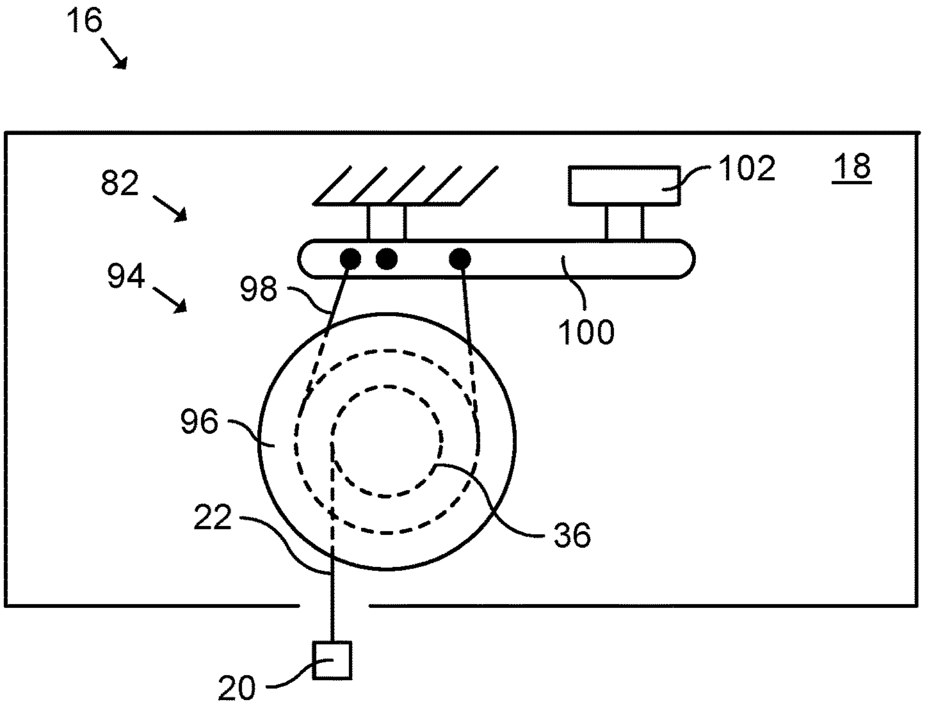
FIG. 20: schematically represents a side view of the arrangement in FIG. 19.

FIG. 19 schematically represents a front view of a further example of an arrangement 16, and FIG. 20 schematically represents a side view of the arrangement 16 in FIG. 19. With collective reference to FIGS. 19 and 20, mainly differences with respect to FIGS. 1-18 will be described. The wire 22 of this example is partly elastic. The wire 22 comprises an elastic part showed with a dashed line and a substantially inelastic part showed with a solid line.

The arrangement 16 further comprises a first pulley 90 and a second pulley 92. Each of the first pulley 90 and the second pulley 92 is rotatable relative to the base section 18 such that the respective rotation axis constitutes the only degree of freedom between therebetween. The elastic part of the wire 22 is wound around the first pulley 90 and the second pulley 92. An end of the wire 22 is fixed to the fixing member 48.

In this example, the elastic part of the wire 22 constitutes the closing spring 44 and therefore replaces the previously described closing spring 44. The arrangement 16 in FIG. 19 therefore requires fewer parts.

The arrangement 16 in FIGS. 19 and 20 comprises a band brake 94. The band brake 94 is a further example of a braking device 82 according to the present disclosure. The band brake 94 constitutes a friction brake.

The band brake 94 of this example comprises a wheel 96, a band 98, a brake arm 100 and an actuator 102. The wheel 96 is fixed to the winding pulley 36.

The band 98 is wound around the wheel 96. Each end of the band 98 is connected to the brake arm 100. The actuator 102 is electrically powered by the control system 54, e.g. by the electric energy storage thereof. The control system 54 controls operation of the actuator 102.

During opening of the door leaf 12, the elastic part of the wire 22 is wound onto the winding pulley 36 and the inelastic part is unwound from the winding pulley 36 causing the winding pulley 36 to rotate. At the same time, the elastic part of the wire 22 between the first pulley 90 and the second pulley 92 is stretched and extended. In this way, the wire 22 between the base section 18 and the fixation part 20 is tensioned.

During closing of the door leaf 12, the elastic part of the wire 22 is unwound from the winding pulley 36 and the inelastic part is wound onto the winding pulley 36 causing the winding pulley 36 to rotate. At the same time, the elastic part of the wire 22 between the first pulley 90 and the second pulley 92 is unstretched and reduced in length. This causes the base section 18 and the fixation part 20 to be forced to move towards each other in the relative closing movement 86.

By actuating the actuator 102, the brake arm 100 moves to tension the band 98 and a braking force is thereby exerted on the wheel 96. As a consequence, the winding pulley 36 is also braked. Also in this way, the tension in the wire 22 between the winding pulley 36 and the fixation part 20 can be reduced. By braking the wire 22, the elastic part of the wire 22 between the winding pulley 36 and the fixing member 48 is made passive. Thus, the force from the stretching of the wire 22 in this part is reduced or eliminated.

Figure 21:
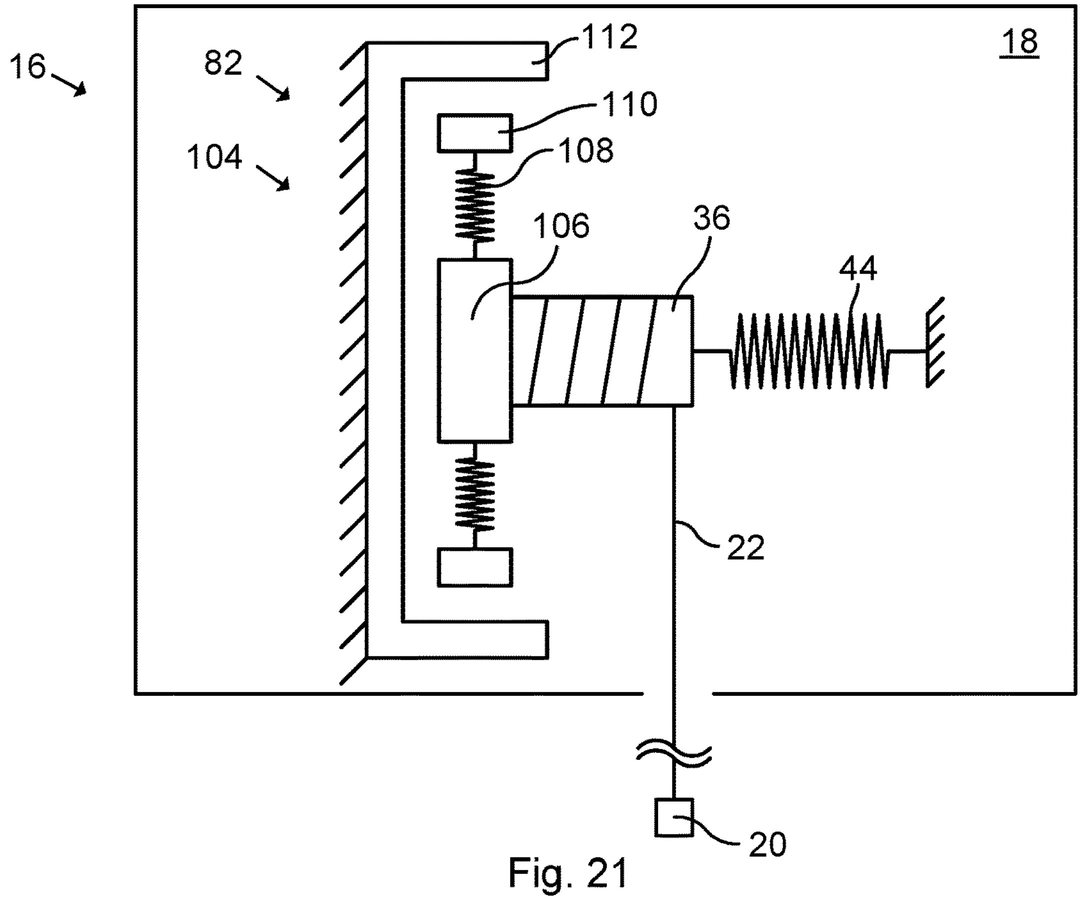
FIG. 21: schematically represents a front view of a further example of an arrangement.

FIG. 21 schematically represents a front view of a further example of an arrangement 16. Mainly differences with respect to FIGS. 1-18 will be described. The arrangement 16 in FIG. 21 is purely mechanical, i.e. it does not comprise any electric components. The arrangement 16 in FIG. 21 does not comprise the generator 32 or the control system 54. The arrangement 16 in FIG. 21 may however optionally comprise the generator 32 and/or the control system 54.

In FIG. 21, the closing spring 44 is a torsion spring. One end of the closing spring 44 is connected to the winding pulley 36 and one end of the closing spring 44 is fixed to the base section 18. The closing spring 44 is tensioned by rotation of the winding pulley 36 in one direction during opening of the door leaf 12 and is relaxed by rotation of the winding pulley 36 in an opposite direction during closing of the door leaf 12.

The arrangement 16 in FIG. 21 comprises a centrifugal clutch 104. The centrifugal clutch 104 is a further example of a braking device 82 according to the present disclosure. The centrifugal clutch 104 constitutes a friction brake.

The centrifugal clutch 104 of this example comprises a hub 106, centrifugal springs 108, brake pads 110 and a centrifugal housing 112. The hub 106 is fixed to the winding pulley 36. Each brake pad 110 is connected to the hub 106 via a centrifugal spring 108. The centrifugal housing 112 is fixed to the base section 18. During low rotational speeds of the winding pulley 36, i.e. during relatively slow movements of the door leaf 12, the centrifugal force acting on the brake pads 110 is not sufficient for engaging the centrifugal clutch 104.

Figure 22:
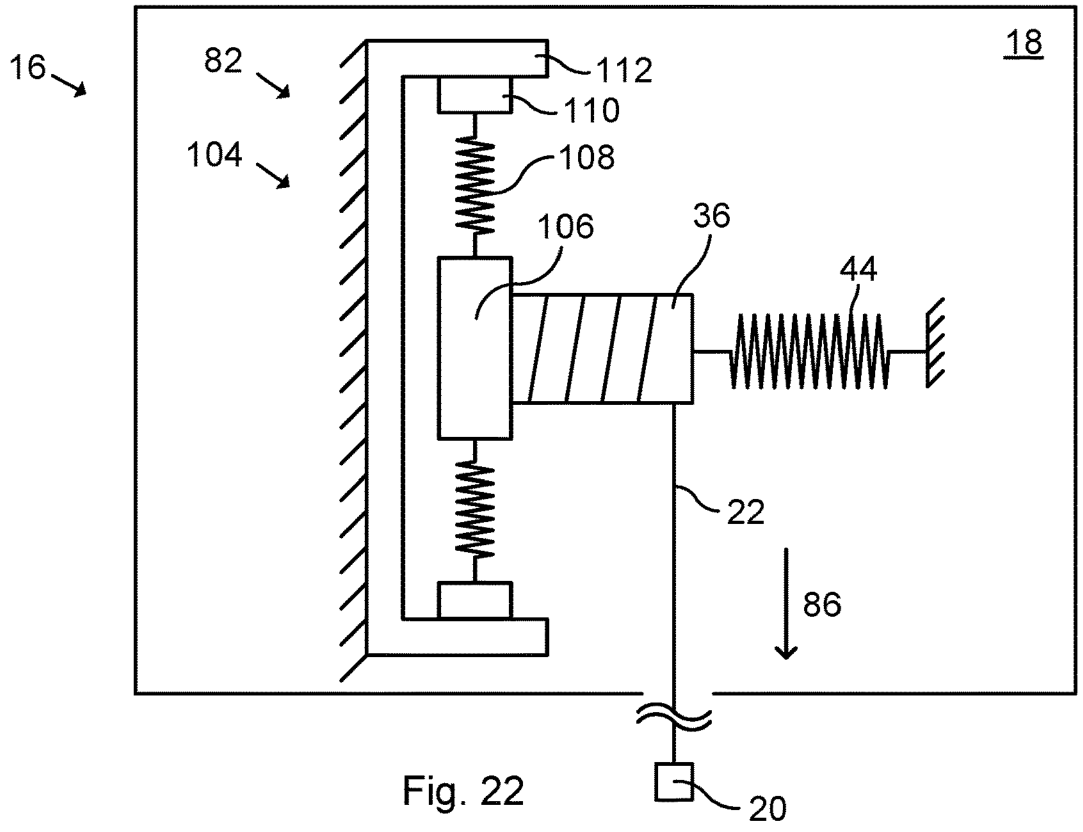
FIG. 22: schematically represents a front view of the arrangement in FIG. 21 during engagement of a centrifugal clutch.

FIG. 22 schematically represents a side view of the arrangement 16 in FIG. 22. In FIG. 22, the rotational speed of the winding pulley 36 is over a threshold value. This causes the centrifugal force acting on the brake pads 110 to be moved against the forces of the centrifugal springs 108 such that the brake pads 110 come into contact with the centrifugal housing 112. As a consequence, the winding pulley 36 is braked. In this way, the arrangement 16 can limit a speed of the closing movement 86. As can be gathered from FIGS. 21 and 22, the arrangement 16 of this example has a very compact design.

Figure 23:
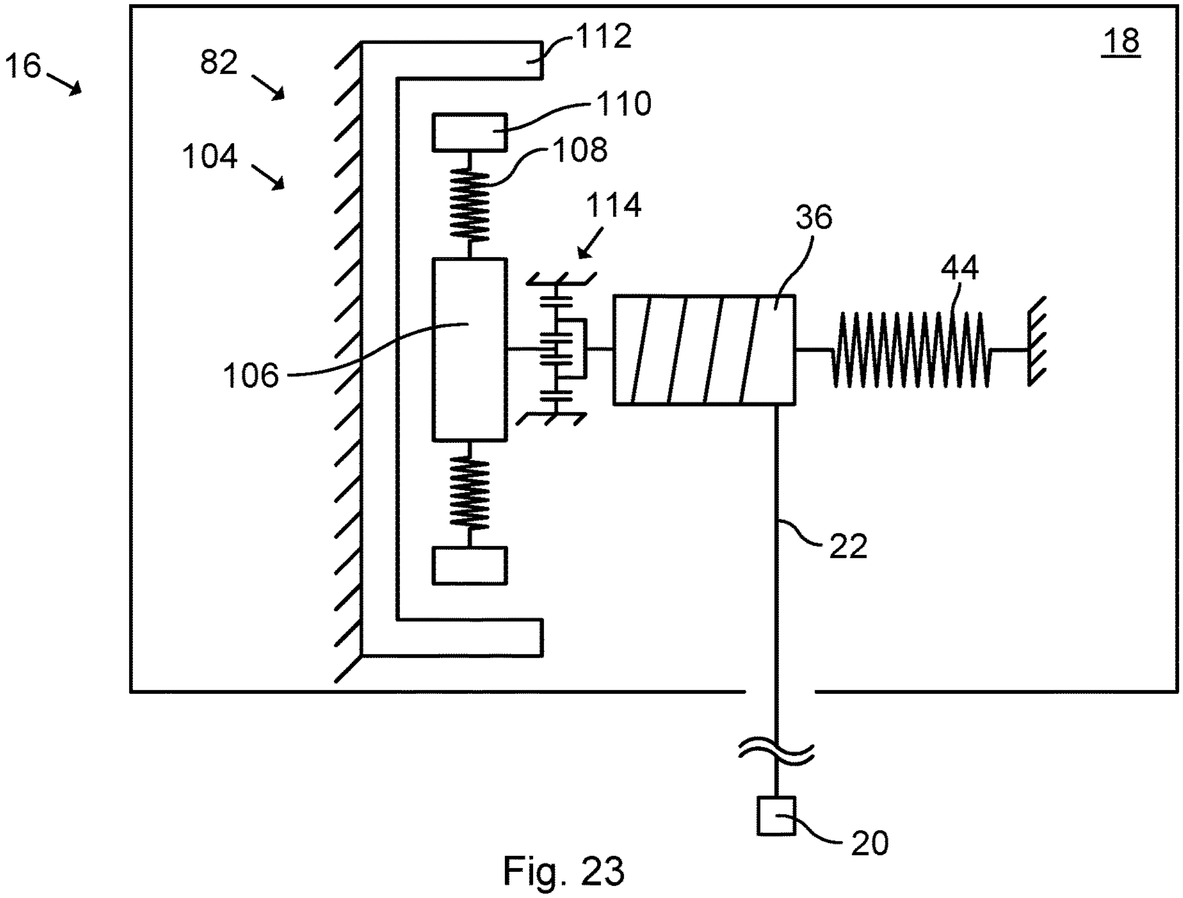
FIG. 23: schematically represents a front view of a further example of an arrangement.

FIG. 23 schematically represents a front view of a further example of an arrangement 16. The arrangement 16 in FIG. 23 differs from the arrangement 16 in FIGS. 21 and 22 in that the arrangement 16 in FIG. 23 further comprises a transmission 114. The transmission 114 is arranged between the winding pulley 36 and the hub 106. The transmission 114 is a speed increasing transmission. That is, the transmission 114 transmits a first rotational speed of the winding pulley 36 to a second rotational speed of the hub 106, higher than the first rotational speed.

Figure 24:
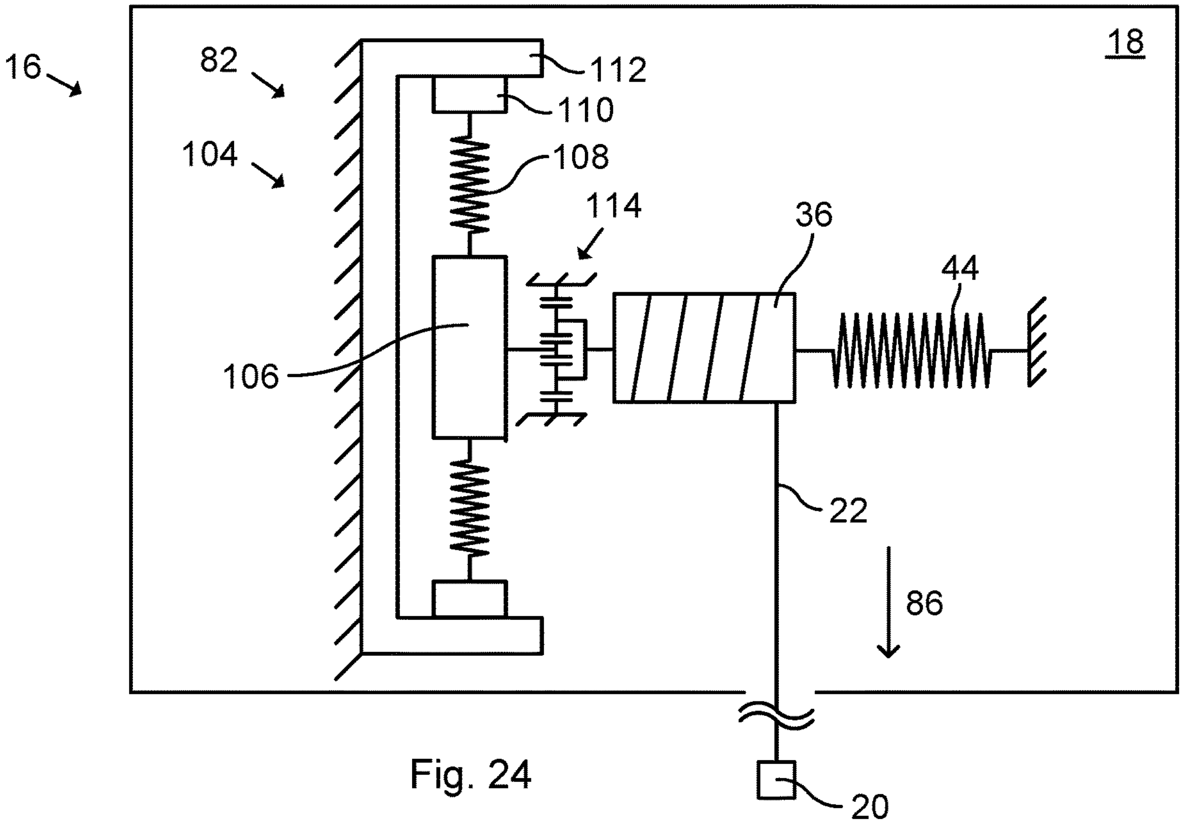
FIG. 24: schematically represents a front view of the arrangement in FIG. 23 during engagement of a centrifugal clutch.

The transmission 114 of this example is a planetary gearing. The planetary gearing comprises a sun gear, a plurality of planet gears, a ring gear and a planet carrier carrying the planet gears. Each planet gear meshes with the sun gear and the ring gear. In this example, the carrier is fixed to the winding pulley 36 and the sun gear is fixed to the hub 106. The ring gear is fixed to the base section 18. FIG. 24 schematically represents a front view of the arrangement 16 in FIG. 23 during engagement of the centrifugal clutch 104. The rotational speed of the hub 106 during engagement of the centrifugal clutch 104 may be at least Boo rpm, such as 1200 rpm.

Figure 25:
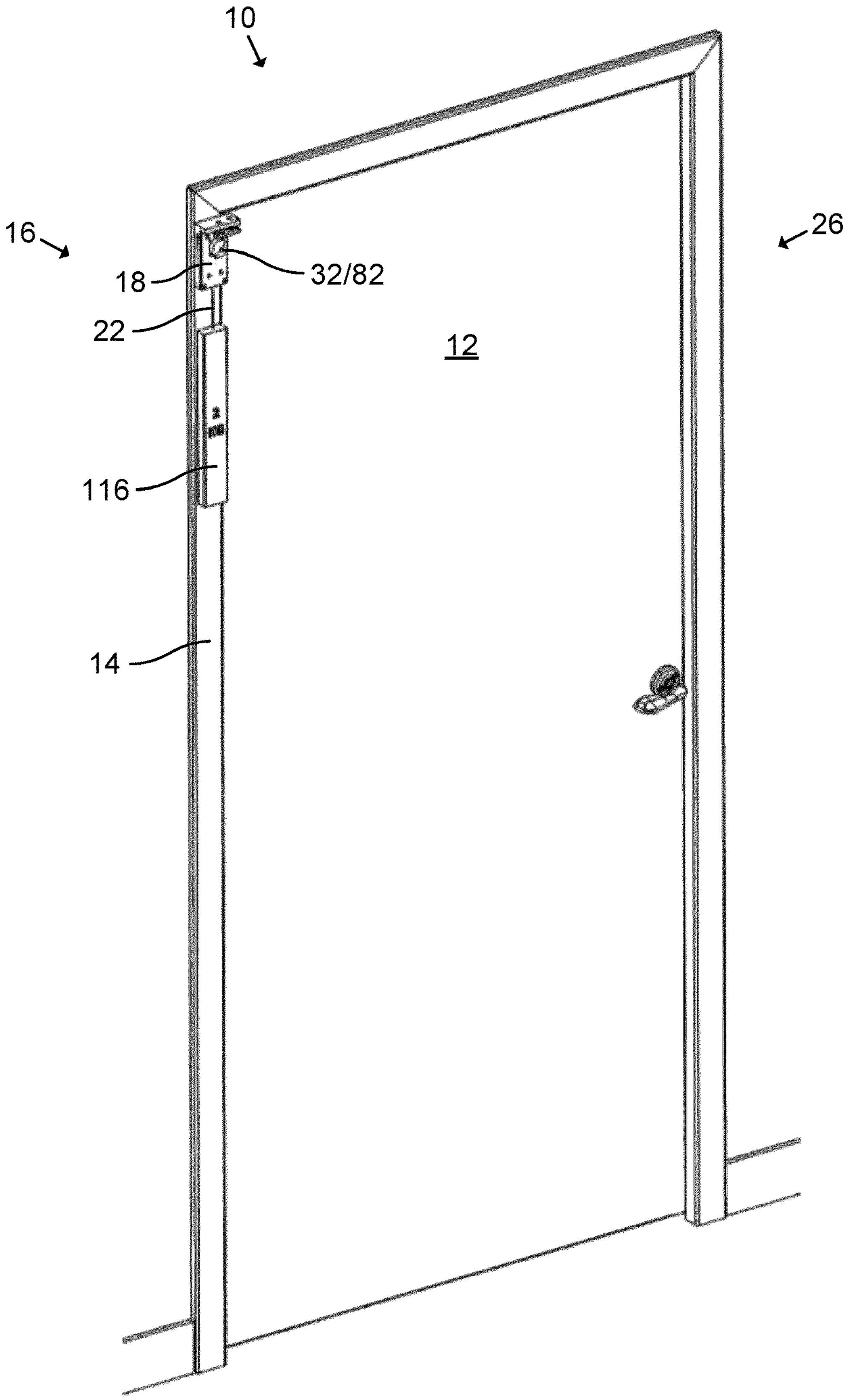
FIG. 25: schematically represents a front perspective view of an access member system comprising a further example of an arrangement.
Figure 26:
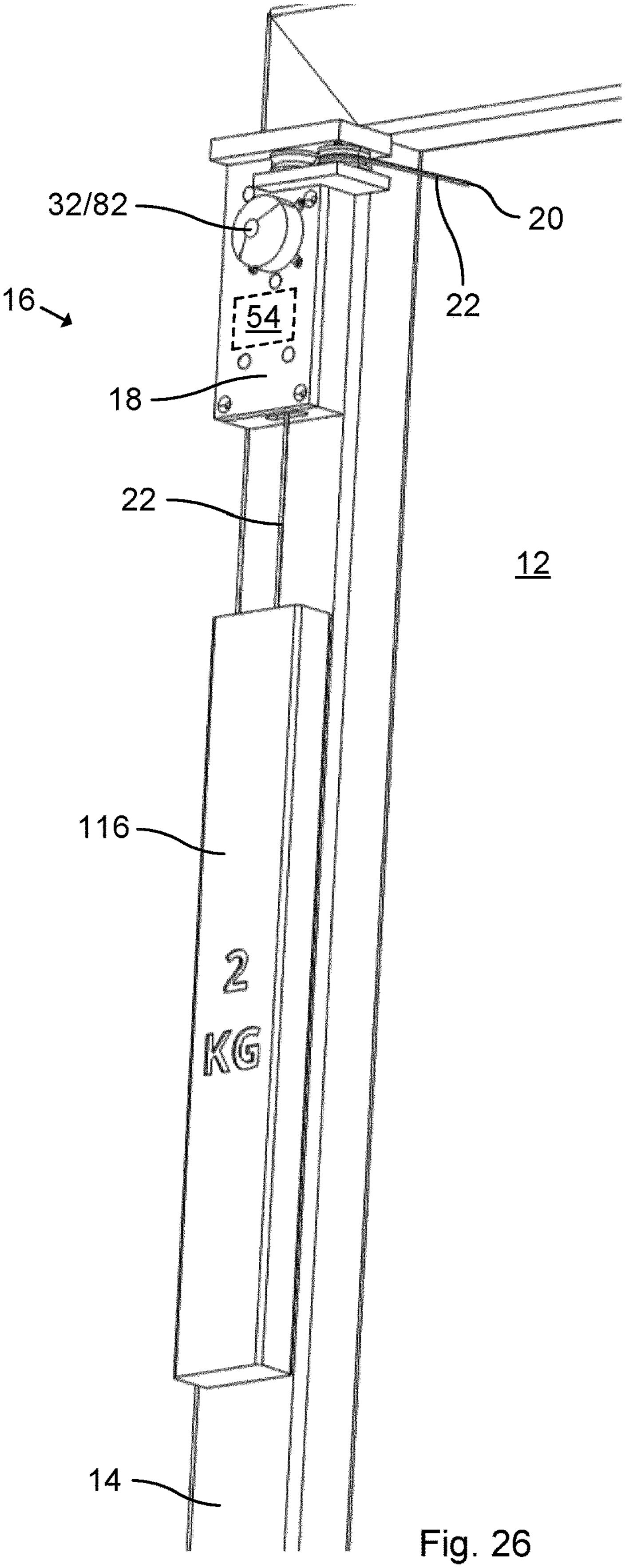
FIG. 26: schematically represents a front perspective view of the arrangement in FIG. 25.

FIG. 25 schematically represents a front perspective view of an access member system 10 comprising a further example of an arrangement 16, and FIG. 26 schematically represents a front perspective view of the arrangement 16 in FIG. 25. Similarly to the arrangement 16 in FIGS. 1-18, the arrangement 16 in FIGS. 25 and 26 comprises a base section 18, a fixation part 20, a flexible wire 22, a braking device 82, an electromagnetic generator 32 and a control system 54. The fixation part 20 is here exemplified as an end of the wire 22.

The arrangement 16 in FIGS. 25 and 26 further comprises a weight 116. The weight 116 is a further example of a closing force device according to the present disclosure. An opposite end of the wire 22 (with respect to the fixation part 20) is fixed to the weight 116. The weight 116 is arranged to move vertically, here along the frame 14. The weight 116 may for example have a mass of 2 kg.

Figure 27:
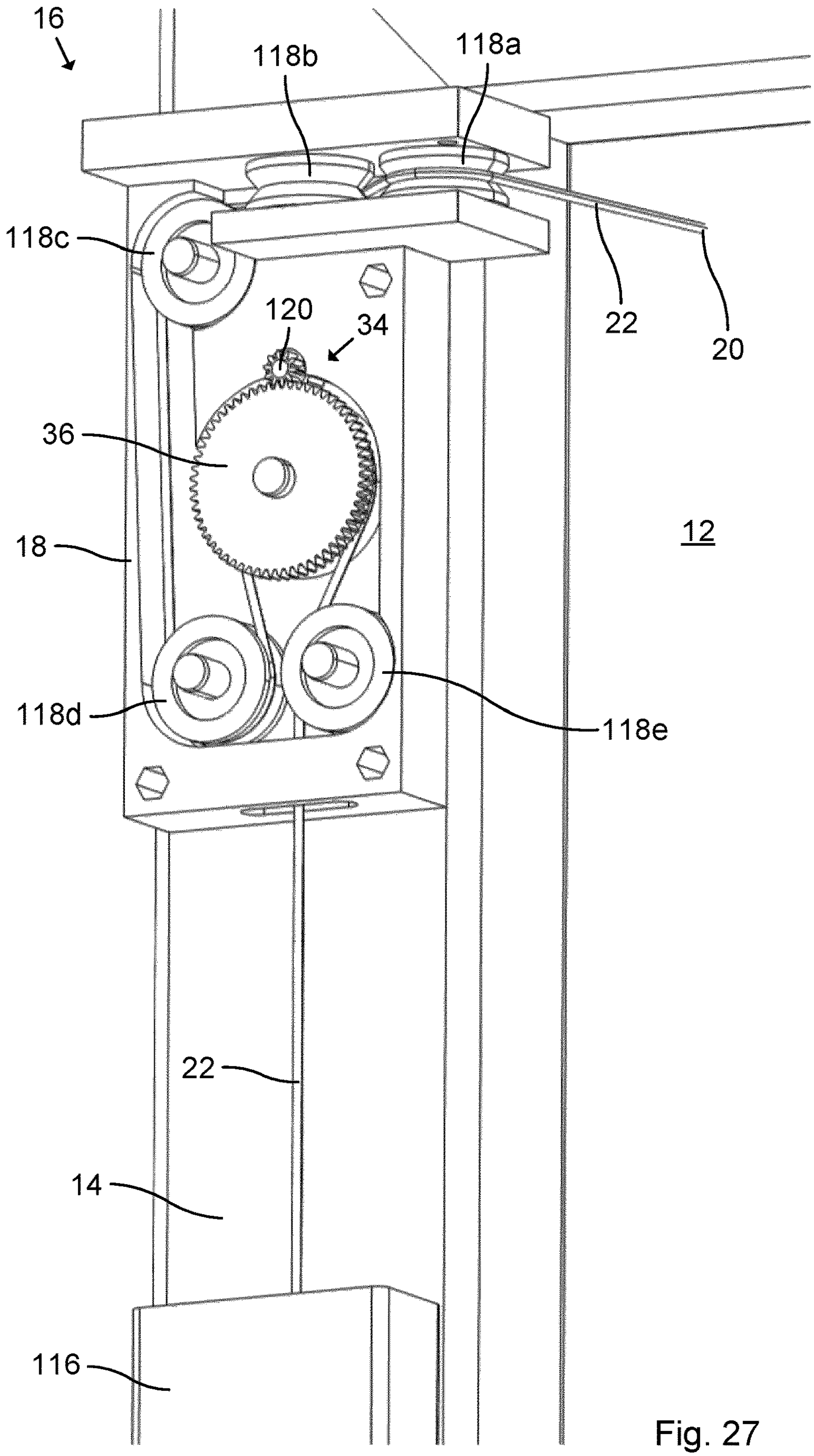
FIG. 27: schematically represents a partial front perspective view of the arrangement in FIGS. 25 and 26.
Figure 28:
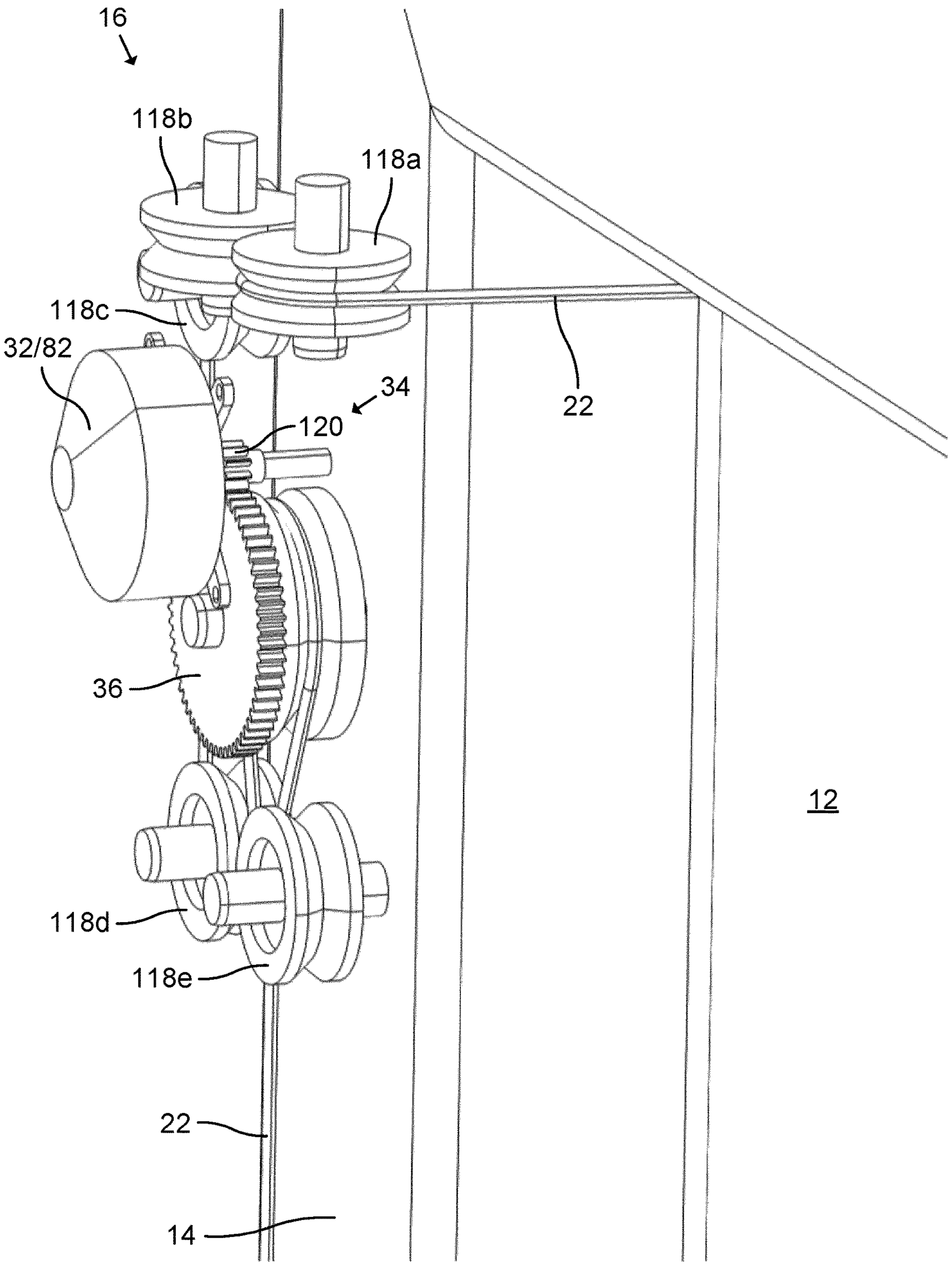
FIG. 28: schematically represents a partial side perspective view of the arrangement in FIGS. 25-27.

FIG. 27 schematically represents a partial front perspective view of the arrangement 16 in FIGS. 25 and 26, and FIG. 28 schematically represents a partial side perspective view of the arrangement 16 in FIGS. 25-27. With collective reference to FIGS. 27 and 28, the arrangement 16 further comprises a winding pulley 36. The wire 22 is wound around the winding pulley 36 and frictionally engages the winding pulley 36. The winding pulley 36 comprises teeth next to the wire 22.

The arrangement 16 of this specific example further comprises, in order along the wire 22 from the fixation part 20, a first pulley **118*a*, a second pulley 118*b*, a third pulley 118*c*, a fourth pulley 118*d* and a fifth pulley 118*e*. The first to fifth pulleys 118*a*-118*e* are here arranged in the base section 18. The wire 22 is wound around each of the first to fifth pulleys 118*a*-118*e*. The first and second pulleys 118*a* and 118*b* are rotatable about a respective vertical axis. The third, fourth and fifth pulleys 118*c*, 118*d* and 118*e*** are rotatable about a respective horizontal axis.

The winding pulley 36 is here arranged between the fourth and fifth pulleys **118*d* and 118*e* along the wire 22. The winding pulley 36 is arranged horizontally between the fourth and fifth pulleys 118*d* and 118*e*, and vertically between the third and fourth pulleys 118*c* and 118*d***.

The arrangement 16 of this example further comprises a rotor gear wheel 120. The rotor gear wheel 120 is in meshing engagement with the teeth of the winding pulley 36. Also the rotor gear wheel 120 is rotatable about a horizontal axis. The rotor gear wheel 120 forms a further example of a transmission 34 arranged to transmit a rotation of the winding pulley 36 to a rotation of the rotor 58. The generator 32 of this example comprises an optional freewheel (not illustrated). The freewheel is engaged in one rotational direction of the rotor gear wheel 120 and is disengaged in the other rotational direction. As an alternative to the freewheel, the rotor gear wheel 120 may be fixed to the rotor 58.

When the door leaf 12 is in the closed position 26, the gravity force acting on the weight 116 tensions the wire 22 such that the door leaf 12 is held closed. When a user opens the door leaf 12, the door leaf 12 pulls the wire 22 which in turn pulls the weight 116 vertically upwards. During the opening movement 84, the wire 22 drives the winding pulley 36 to rotate, which in turn drives the rotor gear wheel 120 to rotate. The freewheel of the generator 32 is however disengaged such that no electric energy is harvested by the opening movement 84 of the door leaf 12. As a result, the force required to open the door leaf 12 is reduced.

When the user releases the door leaf 12 in the open position, the gravity force acting on the weight 116 pulls the weight 116 vertically downwards. The door leaf 12 is thereby pulled by the wire 22 to perform the closing movement 86. During the closing movement 86, the winding pulley 36 is again driven by the wire 22 to rotate, which in turn drives the rotor gear wheel 120 to rotate. The freewheel of the generator 32 is now engaged such that the rotation of the rotor gear wheel 120 is transmitted to a rotation of the rotor 58. Electric energy is thereby harvested by the generator 32. The braking device 82 is controlled vary the electric load of the generator 32 to brake the speed of the closing movement 86 in the same way as described in connection with FIG. 9.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. An arrangement for controlling movements of an access member relative to a frame, the arrangement comprising:

a base section for connection to either the access member or the frame;

a fixation part for connection to the other of the access member and the frame;

a flexible elongated element;

a mechanical closing force device configured to tension the elongated element to thereby force the base section and the fixation part to move towards each other in a relative closing movement;

a braking device arranged to brake a speed of the relative closing movement; and an electromagnetic generator having a stator and a rotor;

wherein the elongated element is arranged to drive the rotor relative to the stator by relative movement between the base section and the fixation part to thereby generate electric energy; and wherein the braking device is arranged to be electrically powered by the generator.

2. The arrangement according to claim 1, wherein the braking device comprises a control element for changing an electric load of the generator.

3. The arrangement according to claim 1, further comprising a winding pulley, wherein the elongated element is wound around the winding pulley.

4. The arrangement according to claim 3, further comprising a transmission arranged to transmit a rotation of the winding pulley to a rotation of the rotor.

5. The arrangement according to claim 1, wherein the braking device comprises a friction brake.

6. The arrangement according to claim 1, further comprising a control system configured to control the braking device to brake the speed of the relative closing movement.

7. The arrangement according to claim 6, wherein the control system is configured to control the braking device to brake the speed of the relative closing movement in dependence of the speed of the relative closing movement.

8. The arrangement according to claim 6, wherein the control system is arranged to be electrically powered by the generator.

9. The arrangement according to claim 1, wherein the elongated element is at least partly elastic such that the elongated element extends when the base section and the fixation part move away from each other to tension the elongated element to thereby force the base section and the fixation part to move towards each other in the relative closing movement.

10. The arrangement according to claim 1, wherein the closing force device comprises a weight arranged to move by a force of gravity acting on the weight to thereby tension the elongated element.

11. The arrangement according to claim 1, wherein the closing force device comprises a spring.

12. The arrangement according to claim 11, further comprising a carrier, and wherein the elongated element is arranged to move the carrier against a force from the closing force device.

13. The arrangement according to claim 12, further comprising a carrier pulley connected to the carrier, wherein the elongated element is wound around the carrier pulley.

14. The arrangement according to claim 13, wherein the generator is arranged between the fixation part and the carrier pulley along the elongated element.

15. The arrangement according to claim 12, wherein a magnet is arranged to force the carrier in a direction that tensions the elongated element by means of magnetic force.

16. The arrangement according to claim 15, further comprising a magnetic target section having a substantially constantly decreasing cross-sectional area in a direction towards the magnet.

17. The arrangement according to claim 1, further comprising a magnet arranged to force the base section and the fixation part towards each other by means of magnetic force.

18. The arrangement according to claim 1, further comprising a mechanical opening force device configured to force the base section and the fixation part away from each other.

19. The arrangement according to claim 18, wherein the opening force device comprises a spring.

20. The arrangement according to claim 1, wherein the elongated element is a wire or a rope.

21. An access member for moving relative to a frame, the access member comprising an arrangement according to claim 1, wherein either the base section or the fixation part is connected to the access member.

22. A frame for an access member, the frame comprising an arrangement according to claim 1, wherein either the base section or the fixation part is connected to the frame.

23. An access member system comprising a frame, an access member movable relative to the frame, and an arrangement according to claim 1, wherein the base section is connected to either the access member or the frame, and wherein the fixation part is connected to the other of the access member and the frame.

24. The access member system according to claim 23, wherein the access member system comprises the arrangement, and wherein the elongated element and an opening force device are arranged in parallel between the frame and the access member.

25. A method of controlling movements of an access member relative to a frame, the method comprising:

providing a base section connected to either the access member or the frame;

providing a fixation part connected to the other of the access member and the frame;

providing an electromagnetic generator, the generator comprising a stator and a rotor;

driving the rotor relative to the stator by means of a flexible elongated element, and by relative movement between the base section and the fixation part, to thereby generate electric energy;

tensioning the elongated element by a mechanical closing force device to thereby force the base section and the fixation part to move towards each other in a relative closing movement; and braking a speed of the relative closing movement by means of electric energy generated by the generator.

* * * * *